(12) United States Patent
Boon et al.

(10) Patent No.: US 8,571,102 B2
(45) Date of Patent: Oct. 29, 2013

(54) IMAGE ENCODING APPARATUS, IMAGE ENCODING METHOD, IMAGE ENCODING PROGRAM, IMAGE DECODING APPARATUS, IMAGE DECODING METHOD, AND IMAGE DECODING PROGRAM

(75) Inventors: Choong Seng Boon, Yokohama (JP); Kazuo Sugimoto, Fujisawa (JP)

(73) Assignee: NTT DoCoMo, Inc., Tokyo (JP)

( * ) Notice: Subject to any disclaimer, the term of this patent is extended or adjusted under 35 U.S.C. 154(b) by 0 days.

(21) Appl. No.: 13/541,502

(22) Filed: Jul. 3, 2012

(65) Prior Publication Data

US 2012/0269450 A1 Oct. 25, 2012

Related U.S. Application Data

(62) Division of application No. 12/852,267, filed on Aug. 6, 2010, now Pat. No. 8,238,426, which is a division of application No. 11/019,375, filed on Dec. 23, 2004, now Pat. No. 7,822,119.

(30) Foreign Application Priority Data

| Dec. 26, 2003 | (JP) | 2003-433715 |
| Mar. 31, 2004 | (JP) | 2004-106262 |
| Sep. 16, 2004 | (JP) | 2004-270169 |

(51) Int. Cl.
*H04N 7/12* (2006.01)

(52) U.S. Cl.
USPC ............ 375/240.12; 375/240.13; 375/240.14; 375/240.15; 375/240.16

(58) Field of Classification Search
USPC ......................... 375/240.13–240.16
See application file for complete search history.

(56) References Cited

U.S. PATENT DOCUMENTS

| 5,227,878 | A | 7/1993 | Puri et al. |
| 5,619,268 | A | 4/1997 | Kobayashi et al. |
| 5,621,467 | A | 4/1997 | Chien et al. |
| 5,748,829 | A | 5/1998 | Yamamoto et al. |
| 6,289,052 | B1 | 9/2001 | Faryar et al. |
| 6,577,771 | B1 | 6/2003 | Okuno et al. |

FOREIGN PATENT DOCUMENTS

| JP | 08-251597 A | 9/1996 |
| WO | WO 97/28650 | 8/1997 |

OTHER PUBLICATIONS

"H.26L Test Model Long Term No. 8 (TML-8) draft0.", ITU-Telecommunications Standardization Sector, Study Group 16, Video Coding Experts Group (VCEG), Jun. 28, 2001, pp. 1-2 and 9-12.

(Continued)

*Primary Examiner* — Sath V Perungavoor
*Assistant Examiner* — Geepy Pe
(74) *Attorney, Agent, or Firm* — Oblon, Spivak, McClelland, Maier & Neustadt, L.L.P.

(57) ABSTRACT

The image encoding apparatus of one embodiment of the present invention comprises a coding mode determination unit, a prediction image generation unit, a storage unit, and an encoding unit. The coding mode determination unit determines a coding mode relating to which of the first image prediction processing or second image prediction processing is used for generating prediction image of a partial area of input images. The prediction image generation unit extracts the prediction assist information by the first image prediction processing and generates a prediction image based on the prediction assist information. The storage unit stores the reproduced image that is based on the prediction image. The encoding unit generates a bit stream comprising data obtained by encoding the coding mode information and prediction assist information.

9 Claims, 26 Drawing Sheets

(56) References Cited

OTHER PUBLICATIONS

Patrick Ndjiki-Nya, et al., "Improved H.264/AVC Coding Using Texture Analysis and Synthesis", Proceedings 2003 International Conference on Image Processing, ICIP 2003, vol. 3 of 3, XP-010669967, Sep. 14, 2003, pp. 849-852.

Siu-Leong Yu, et al., "New Intra Prediction using Intra-Macroblock Motion Compensation", Joint Video Team (JVT) of ISO/IEC MPEG and ITU-T VCEG, XP-002324083, May 6, 2002, 10 pages.

Ralf Schäfer, et al., "The emerging H.264/AVC standard", EBU Technical Review, XP-002903652, Jan. 2003, pp. 1-12.

Li-Yi Wei, et al., "Fast Texture Synthesis using Tree-structured Vector Quantization", Computer Graphics, SIGGRAPH 2000, Conference Proceedings, XP-001003589, Jul. 23, 2000, pp. 479-488.

Cristina Gomila, et al., "New features and applications of the H.264 video coding standard", Proceedings, 2003, ITRE2003, Aug. 13, 2003, pp. 6-10.

"Handbook of Image Analysis." Edited by Mikio Takagi and Haruhisa Shimboda, University of Tokyo Press, Jan. 17, 1991, 1$^{st}$ Ed. pp. 707-744 (with English Translation).

Marta Karczewicz, et al., "Nokia MVC H.26L Proposal Description", ITU Study Group 16-Video Coding Experts Group, XP-002420198, May 16, 2000, pp. 1-66.

Per Fröjdh, et al., "Block Orders for H.26L Intra Prediction", ITU Study Group 16-Video Coding Experts Group, XP-002420199, Aug. 22, 2000, pp. 1-2.

T. Wiegand, "Draft Text of Final Draft International Standard (FDIS) for Advanced Video Coding AVC.", JVT, ISO/IEC ,JTC 1/SC 29WG 11 N5555, XP-001091555, Mar. 31, 2003, pp. i-xv and pp. 1-226.

L. Wang, et al., "Interlace Coding Tools for H.26L Video Coding", ITU Study Group 16-Video Coding Experts Group, XP-002240263, Dec. 4, 2001, pp. 1-20.

Per Fröjdh, et al., "Constrained Intra Prediction Coding", ITU Study Group 16-Video Coding Experts Group, XP-002420200, Sep. 24, 2001, pp. 1-3.

Kazushi Sato, et al., "Consideration on Intra Prediction for Pipeline Processing", Joint Video Team (JVT) of ISO/IEC MPEG & ITU-T VCEG (ISO/IEC JTC1/SC29WG11 and ITU-T SG 16 Q.6), XP-002420201, Dec. 5, 2002, pp. 1-29.

Kazuo Sugimoto, et al., "Inter Frame Coding with Template Matching Spatio-Temporal Prediction", International Conference on Image Processing (ICIP), vol. 1, XP-010784855, Oct. 24, 2004, pp. 465-468.

Boon Choong Seng, et al. "Recent Technology of Mobile Multimedia No. 4, Current Trend on Video Coding Technology—H.264/AVC Standard-" NTT DoCoMo Technical Journal, The Telecommunication Association, vol. 11, No. 3, Oct. 1, 2003, 9 Pages of English Translation, pp. 55-63 and 1 back Page.

Richardson, I. E.G., "H264/MPEG-4 Part 10 White Paper—Prediction of Intra Macroblocks," Apr. 30, 2003, XP002281494, pp. 1-6.

Fig.17 (a)
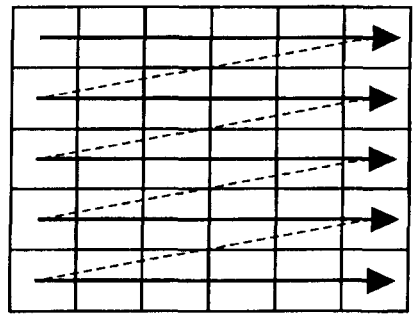
(b)
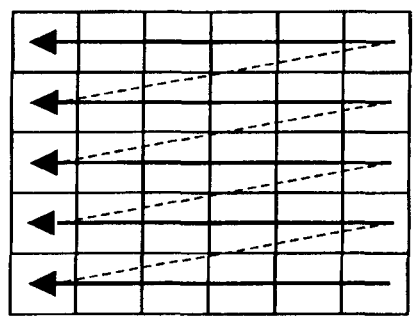
(c)
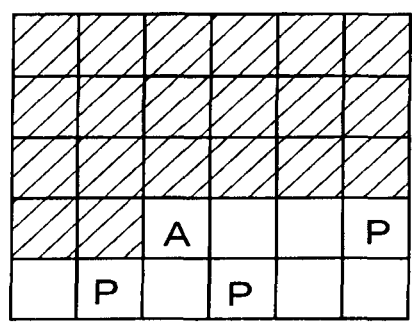

IMAGE ENCODING APPARATUS, IMAGE ENCODING METHOD, IMAGE ENCODING PROGRAM, IMAGE DECODING APPARATUS, IMAGE DECODING METHOD, AND IMAGE DECODING PROGRAM

CROSS-REFERENCE TO RELATED APPLICATIONS

This application is a division of U.S. application Ser. No. 12/852,267 filed Aug. 6, 2010, which is a division of, and claims the benefit of priority under 35 U.S.C. §120 from, U.S. application Ser. No. 11/019,375 filed Dec. 23, 2004 (now U.S. Pat. No. 7,822,119 issued Oct. 26, 2010), each of which are incorporated herein by reference. U.S. application Ser. No. 11/019,375 claims the benefit of priority under 35 U.S.C. §119 from Japanese Patent Application Nos. 2003-433715 filed Dec. 26, 2003, 2004-106262 filed Mar. 31, 2004 and 2004-270169 filed Sep. 16, 2004.

BACKGROUND OF THE INVENTION

1. Field of the Invention

The present invention relates to an image encoding apparatus, an image encoding method, an image encoding program, an image decoding apparatus, an image decoding method, and an image decoding program.

2. Related Background of the Invention

In recent years, due to a wide spread of internet, transmission and reception of image data or storing of image data have been widely conducted via a network. Generally, a lossy coding system capable of efficiently reducing the volume of image data is used for image data encoding. An H.264 video encoding system, which is an international standard recommended by the ITU-T (for example, ITU-T VCEG (Q.6/16), "H.26L Test Model Long Term Number 8 (TML-8) draft0") is an example of the lossy coding system.

In the intra coding frame (I frame) of H.264, video compression is performed by intra-frame coding using Intra prediction. Further, in the inter-frame coding of H.264, the coding target frame is divided, for example, in macroblocks with a size of 16×16 pixels and the encoding is then performed for each macroblock. The macroblocks are further divided into blocks with a size of 16×8 pixels or 8×8 pixels and the motion compensation prediction is performed for each divided block. As a result, the redundancy of the video in the time direction is reduced.

SUMMARY OF THE INVENTION

However, an encoding technology with even better efficiency is required for image encoding such as the above-described video encoding or still image encoding.

Accordingly, it is an object of the present invention to provide an image encoding apparatus, an image encoding method, and an image encoding program that can encode images efficiently and also to provide an image decoding apparatus, an image decoding method, and an image decoding program that can decode images from a bit stream generated with the image encoding apparatus in accordance with the present invention.

An image encoding apparatus according to one aspect of the present invention comprises: (a) determination means for determining a coding mode and generating coding mode information for specifying the coding mode, the coding mode relating to which of a first image prediction processing that requires prediction assist information for generating a prediction image or a second image prediction processing is to be used for generating the prediction image of each of a plurality of partial areas of predetermined size obtained by dividing an input image of a coding target; (b) first image prediction means for executing the first image prediction processing to extract prediction assist information and generate the prediction image based on the prediction assist information for a partial area, out of the plurality of partial areas, which is specified as an area whose prediction image has to be generated by the first image prediction processing, the prediction assist information being information for generating the prediction image from an already-generated reproduced image of other partial area; (c) storage means for storing a reproduced image that is based on the prediction image; and (d) encoding means for generating a bit stream including data obtained by encoding the coding mode information and the prediction assist information.

An image encoding method according to another aspect of the present invention comprises: (a) a determination step in which determination means determines a coding mode and generates coding mode information for specifying the coding mode, the coding mode relating to which of a first image prediction processing that requires prediction assist information for generating a prediction image or a second image prediction processing is to be used for generating the prediction image of each of a plurality of partial areas of predetermined size obtained by dividing an input image of a coding target; (b) a first image prediction step in which first image prediction means executes the first image prediction processing to extract prediction assist information and generate the prediction image based on the prediction assist information for a partial area, out of the plurality of partial areas, which is specified as an area whose prediction image has to be generated by the first image prediction processing, the prediction assist information being information for generating the prediction image from an already-generated reproduced image of other partial area; (c) a storage step in which storage means stores a reproduced image that is based on the prediction image; and (d) an encoding step in which encoding means generates a bit stream including the data obtained by encoding the coding mode information and the prediction assist information.

Further, an image encoding program of yet another aspect of the present invention is a program that causes a computer to function as (a) determination means for determining a coding mode and generating coding mode information for specifying the coding mode, the coding mode relating to which of a first image prediction processing that requires prediction assist information for generating a prediction image or a second image prediction processing is to be used for generating the prediction image of each of a plurality of partial areas of predetermined size obtained by dividing an input image of a coding target; (b) first image prediction means for executing the first image prediction processing to extract prediction assist information and generate the prediction image based on the prediction assist information for a partial area, out of the plurality of partial areas, which is specified as an area whose prediction image has to be generated by the first image prediction processing, the prediction assist information being information for generating the prediction image from an already-generated reproduced image of other partial area; (c) storage means for storing a reproduced images that is based on the prediction image; and (d) encoding means for generating a bit stream including data obtained by encoding the coding mode information and the prediction assist information. It is should be noted that the above-mentioned image encoding program and image encoding program explained hereinbelow are provided as a computer-readable recording medium, a computer data signal superimposed on a carrier wave, or a program product.

The aforementioned second image prediction processing can be a processing where a prediction image is generated by a process in which an area containing a portion of pixels whose prediction signal has not been generated is defined as a template, the already-generated reproduced image is defined as a reference area, an area in the reference area that has a high correlation with the template is selected as a duplicative reference area, and pixel values of corresponding pixels inside the duplicative reference area are given to pixels of which prediction signal has not been generated in the template.

Further, an image decoding apparatus according to one aspect of the present invention comprises: (a) decoding means for decoding coding mode information and prediction assist information from a bit stream which includes data obtained by encoding the coding mode information for specifying a first image prediction processing or second image prediction processing used for generation a prediction image with respect to each of a plurality of partial areas of predetermined size obtained by dividing an image of a decoding target and the prediction assist information for generating the prediction image by the first image prediction processing; (b) first image prediction means for generating the prediction image of a partial area, out of the plurality of partial areas, that is specified as an area for which the prediction image has to be generated by the first image prediction processing on the basis of the coding mode information, by the first image prediction processing using the prediction assist information from an already-generated reproduced image; (c) second image prediction means for generating by the second image prediction processing the prediction image of a partial area, out of the plurality of partial areas, that is specified as an area for which the prediction image has to be generated by the second image prediction processing on the basis of the coding mode information; and (d) storage means for storing a reproduced image that is based on the prediction image, wherein (e) in the second image prediction processing, the prediction image is generated by a process in which an area containing a portion of pixels whose prediction signal has not been generated is defined as a template, the reproduced image stored in the storage means is defined as a reference area, an area in the reference area which has a high correlation with the template is selected as a duplicative reference area, and pixel values of corresponding pixels inside the duplicative reference area are given to pixels of which prediction signal has not been generated in the template.

An image decoding method according to yet another aspect of the present invention comprises: (a) a decoding step in which decoding means decodes coding mode information and prediction assist information from a bit stream which includes data obtained by encoding the coding mode information for specifying a first image prediction processing or second image prediction processing used for generation a prediction image with respect to each of a plurality of partial areas of predetermined size obtained by dividing an image of a decoding target and the prediction assist information for generating the prediction image by the first image prediction processing; (b) a first image prediction step in which first image prediction means generates the prediction image of a partial area, out of the plurality of partial areas, that is specified as an area of which the prediction image has to be generated by the first image prediction processing on the basis of the coding mode information, by the first image prediction processing using the prediction assist information from an already-generated reproduced image from the generated reproduced images of other partial areas; (c) a second image prediction step in which second image prediction means generates, by using the second image prediction processing, the prediction image of a partial area, out of a plurality of partial areas, that is specified as an area of which the prediction image has to be generated by the second image prediction processing on the basis of the coding mode information; and (d) a storage step in which storage means stores a reproduced image that is based on the prediction image, wherein (e) in the second image prediction processing, the prediction image is generated by a process in which an area containing a portion of pixels whose prediction signal has not been generated is defined as a template, the reproduced image stored in the storage means is defined as a reference area, an area in the reference area which has a high correlation with the template is selected as a duplicative reference area, and pixel values of corresponding pixels inside the duplicative reference area are given to pixels of which prediction signal has not been generated in the template.

Further, an image decoding program of yet another aspect of the present invention is a program that causes a computer to function as (a) decoding means for decoding coding mode information and prediction assist information from a bit stream which includes data obtained by encoding the coding mode information for specifying a first image prediction processing or second image prediction processing used for generation a prediction image with respect to each of a plurality of partial areas of predetermined size obtained by dividing an image of a decoding target and the prediction assist information for generating the prediction image by the first image prediction processing; (b) first image prediction means for generating the prediction image of a partial area, out of the plurality of partial areas, that is specified as an area of which the prediction image has to be generated by the first image prediction processing on the basis of the coding mode information, by the first image prediction processing using the prediction assist information; from the generated reproduced images of other partial areas; (c) second image prediction means for generating by the second image prediction processing the prediction image of a partial area, out of the plurality of partial areas, that is specified as an area for which the prediction image has to be generated by the second image prediction processing on the basis of the coding mode information; and (d) storage means for storing a reproduced image that is based on the prediction image. This program causes a computer to function so that (e) in the second image prediction processing, the prediction image is generated by a process in which an area containing a portion of pixels whose prediction signal has not been generated is defined as a template, the reproduced image stored in the storage means is defined as a reference area, an area in the reference area which has a high correlation with the template is selected as a duplicative reference area, and pixel values of corresponding pixels inside the duplicative reference area are given to pixels of which prediction signal has not been generated in the template. It is should be noted that the above-mentioned image decoding program and image decoding program explained hereinbelow are provided as a computer-readable recording medium, a computer data signal superimposed on a carrier wave, or a program product.

In accordance with the above-described present invention, in the second image prediction processing, the reproduced image that has already been generated are set as the reference area, and the corresponding pixels in the duplicative reference area selected from the reference area are copied into the pixels of which the prediction image were not generated in the template. An area among the reference area that has a high correlation with the template is selected as the duplicative reference area. For example, an area with the highest correlation value or an area for which the correlation value goes beyond a predetermined criterion value first is selected. Therefore, in the decoding side, the prediction image can be actively generated without using the prediction assist information from the encoding side with respect to the partial area which is specified as an area where the prediction image has to be generated by the second image prediction processing. As a result, effective coding is attained in the encoding side.

In the inventions relating to image encoding, it is preferred that the determination means generates the reproduced images of the plurality of partial areas in a predetermined scanning order via the first image prediction processing, then selects a processing target partial area in the inverse order from the predetermined scanning order, set as the reference area the image of a partial area positioned in front in the predetermined scanning order and the reproduced image of the partial area of which the coding mode has been determined as an area of which the prediction image has to be generated by the first image prediction processing and which is the partial area positioned behind in the predetermined scanning order, generates the reproduced image of the processing target partial area via the second image prediction processing, and determines the coding mode of the processing target partial area by comparison of the reproduced image of the processing target partial area generated via the second image prediction processing and the reproduced image of the processing target partial area generated via the first image prediction processing.

In this case, in the inventions relating to image decoding, the first image prediction means generates by the first image prediction processing the prediction image in a predetermined scanning order with respect to the partial area which is specified as an area for which the prediction image has to be generated by the first image prediction processing on the basis of the coding mode information, and after the reproduced image based on the prediction image has been stored in the storage means, the second image prediction means generates by the second image prediction processing the prediction image in the predetermined scanning order with respect to the partial area which is specified as an area of which the prediction image has to be generated by the second image prediction processing on the basis of the coding mode information.

In accordance with the present invention, the reproduced images are earlier generated by the first image prediction processing. Thereafter, the reproduced image, that has already been generated, is set as the reference area in the second image prediction processing. Therefore, the reproduced image positioned behind in the predetermined scanning order can be used for the second image prediction processing. As a result, the redundancy in the space direction can be reduced more effectively.

In the inventions relating to image encoding, the determination means can compute a cost value by use of a cost function based on the coding distortion and/or coded data volume for the reproduced image of the processing target partial region generated via the second image prediction processing and the cost value for the reproduced image of the processing target partial region generated via the first image prediction processing, and can determine the coding mode of the processing target partial area on the basis of the cost values.

In the inventions relating to image encoding, there is further provided a second image prediction means for generating by the second image prediction processing a prediction image of the partial area which is specified as an area of which the prediction image has to be generated by the second image prediction processing on the basis of the coding mode information, among the plurality of partial areas, and the second image prediction means sets the prediction image generated by the second image prediction processing as the reproduced image In this case, in the inventions relating to image decoding, the second image prediction means sets the prediction image generated by the second image prediction processing as the reproduced image That is, the prediction image generated by the second image prediction processing is used as the reproduced image. Therefore, the reproduced image generated by the second image prediction processing can be also used for the prediction of the partial area that is processed in succession, and hence the redundancy is further reduced. Furthermore, encoding with even higher efficiency can be attained because it is not necessary to include into the bit stream the information relating to the difference between the input image and the prediction image generated by the second image prediction processing.

In accordance with the present invention, the input image of the coding target can be a video frame. In this case, in the second image prediction processing, at least one of the reproduced image of a coding target frame and reproduced image of a frame processed before the coding target frame is set as the reference area. Furthermore, in this case, in the present inventions relating to image decoding, the image of the decoding target is a video frame, and the second image prediction means sets as the reference area at least one of the reproduced image of the decoding target frame, which is the reproduced image stored in the storage means, and the reproduced image of a frame processed before the decoding target frame.

In accordance with the present invention, in the second image prediction processing, both the reproduced image of the coding target frame and the reproduced image of the already-processed frame, which is different from the coding target frame, are set as the reference area. Therefore, the redundancy in the time direction and space direction is further reduced.

In the inventions relating to the image encoding, the first image prediction processing can be a motion compensation prediction processing. In this case, the prediction assist information includes a motion vector extracted by the first image prediction processing. Further, in this case, in the inventions relating to image decoding, too, the prediction assist information comprises a motion vector used in the first image prediction processing.

In the present inventions, the first image prediction processing can be a processing for generating the prediction image by using for the prediction the reproduced image in the same space as the processing target partial area. That is, the first image prediction processing can be the prediction processing used for encoding and decoding still images or an intra-frame prediction processing used for video encoding and decoding. In this case, in the first image prediction processing, when the adjacent partial area, which is adjacent to the processing target partial area, is specified as the partial area for which the prediction image has to be generated by the second image prediction processing from the coding mode, the prediction image of the processing target partial area is generated based on the reproduced image of non-adjacent partial area, which is not adjacent to the processing target partial area.

In accordance with the present invention, even when the processing target partial area is the area for which the prediction image has to be generated by the first image prediction processing and the adjacent partial area, which is adjacent to the processing target partial area, is the area for which the prediction image has to be generated by the second image prediction processing, the prediction image can be generated by using the reproduced image data of the non-adjacent partial area, which is not adjacent to the processing target partial area. As a result, the prediction image can be generated by using not only the reproduced image of the adjacent partial area, which is adjacent to the processing target partial area, but also the reproduced image of the non-adjacent partial area, which is not adjacent to the processing target partial area. Therefore, the reference range for generating the prediction image data is expanded, and thus spatial redundancy is reduced. Consequently, the encoding efficiency is further increased.

Further, in this case, in the inventions relating to image encoding, in the first image prediction processing, a prediction mode to be used for the generation of the prediction image of the processing target partial area can be determined from a plurality of prediction modes relating to a plurality of different prediction rules, the prediction mode information for specifying this prediction mode can be generated, and the encoding means can include the data obtained by encoding the prediction mode information into the bit stream. In this case, in the inventions relating to image decoding, the bit stream includes the data obtained by encoding the prediction mode information specifying the prediction mode used for the first image prediction processing, among a plurality of prediction modes relating to a plurality of different prediction rules, when the prediction image was generated by the first image prediction processing, and the decoding means decodes the prediction mode information from the bit stream and the prediction image is generated based on the prediction mode information in the first image prediction processing.

In accordance with the present invention, it is preferred that in the first image prediction processing, when an adjacent partial area, which is adjacent to the processing target partial area, is specified as a partial area for which the prediction image has to be generated by the second image prediction processing from the coding mode, the prediction image is generated based on the pixel value of the pixel closest to the processing target partial area, among the reproduced images of the non-adjacent partial area located on the straight line of the prediction direction and located in the direction of the prediction origin. The optimum reproduced image data matching each prediction image generation pattern is thereby selected from the non-adjacent block.

In the inventions relating to image encoding, prediction residual image generation means can generate a prediction residual image by executing the differential computation of the prediction image generated by the first image prediction means and the coding target input image, and the encoding means can include into the bit stream the data obtained by encoding the signal that is based on the prediction residual image.

In this case, in the inventions relating to image decoding, the bit stream includes the data obtained by encoding the signal that is based on the prediction residual image obtained by differential computation of the prediction image of the partial area generated by the first image prediction and the image (input image) of this partial area, the decoding means decodes the signal from those data which are contained in the bit stream and obtained by encoding the signal that is based on the prediction residual image, and the reproduced image generation means generates the reproduced image by adding the prediction image and the restored prediction residual image based on the signal decoded by the decoding means.

Further, in the inventions relating to image encoding, the prediction residual image generation means can generate the prediction residual image by executing the differential computation of the prediction image generated by the first image prediction means and the coding target input image, transformation means can generate the transformation information by executing the transformation processing of the prediction residual image, inverse transformation means can generate the restored prediction residual image by executing the inverse transformation processing of the transformation information, the reproduced image generation means can generate the reproduced image by adding up the restored prediction residual image and the prediction image, and encoding means may include the data obtained by encoding the transformation information.

In this case, in the inventions relating to image decoding, the bit stream includes the data generated by encoding the transformation information obtained by conducting the transformation processing of the prediction residual image obtained by differential computation of the prediction image of the partial area generated by the first image prediction and the image (input image) of this partial area, the decoding means decodes the transformation information from the bit stream, the inverse transformation means generates the restored prediction residual image by conducting the inverse transformation processing of the transformation information, and the reproduced image generation means generates the reproduced image by adding up the restored prediction residual image and the prediction image.

BRIEF DESCRIPTION OF THE DRAWINGS

FIG. 17 is an explanatory diagram for the processing of a coding mode determination unit;

DESCRIPTION OF THE PREFERRED EMBODIMENTS

Figure 1:
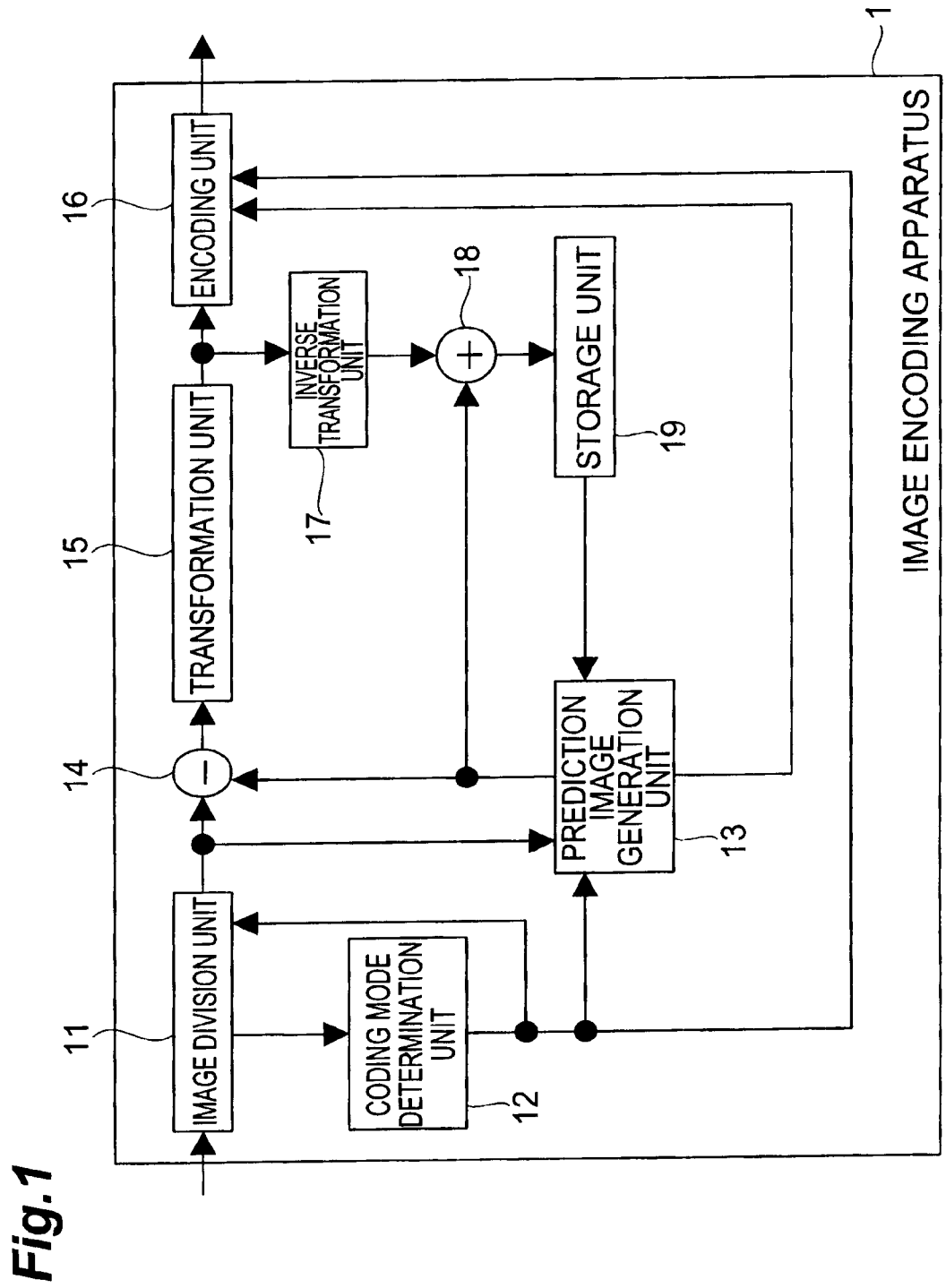
FIG. 1 is a diagram showing a configuration of an image encoding apparatus of a first embodiment.

The preferred embodiments of the present invention will be described below in detail with reference to the drawings. The identical or equivalent parts in the drawings are assigned with identical reference symbols.

Initially, the first embodiment of the present invention will be described. FIG. 1 is a diagram showing a configuration of an image encoding apparatus of a first embodiment. An image encoding apparatus 1 shown in FIG. 1 physically can be a computer comprising, for example, a CPU (central processing unit), a storage device such as a memory, a display device such as a display, and a communication unit. Further, the image encoding apparatus 1 may be a mobile communication terminal such as a cellular phone, a DVD device, and the like. Thus, a wide variety of devices capable of information processing can be used as the image encoding apparatus.

The image encoding apparatus 1 functionally comprises an image division unit (image division means) 11, a coding mode determination unit (determination means) 12, a prediction image generation unit (first image prediction means) 13, a subtraction unit (prediction residual image generation means) 14, a transformation unit (transformation means) 15, an encoding unit (encoding means) 16, an inverse transformation unit (inverse transformation means) 17, an addition unit (reproduced image generation means) 18, and a storage unit (storage means) 19.

Each structural element shown in FIG. 1 will be described below. The image division unit 11 divides the input image, which is inputted in the frame units, into blocks, that is, partial areas, of the predetermined size (for example, 4×4 pixels). Further, the image division unit 11 generates block position information for specifying a processing target block which is the target of encoding processing. The block position information can be a block number obtained by assigning numbers onwards to each block in the frame in the order of raster scanning, for example, in the ascending order as 0, 1, 2 and, or block coordinate indicating a coordinate with respect to the origin of the upper left end of the frame comprising each block.

The coding mode determination unit 12 determines the coding mode for each block on the basis of the predetermined coding mode determination rule and generates the coding mode information for specifying the coding mode.

In the present embodiment, the coding mode can be a prediction coding processing mode (P mode) which is a mode for encoding the image of the processing target block by using an input image of the processing target block and a prediction image corresponding to this image and a compensation coding mode (C mode) which is a mode for encoding the image of the processing target block without using an input image of the processing target block and a prediction image corresponding to this image. That is, when the coding mode is a prediction coding processing mode, the information relating to the image of the processing target block is encoded and outputted. On the other hand, when the coding mode is a compensation coding processing mode, the information relating to the image of the processing target block is neither encoded nor outputted. Furthermore, when the coding mode is the prediction coding processing mode, the prediction image is generated by the first image prediction processing in which the prediction assist information is necessary for generating the prediction image on the decoding side, and when the coding mode is the compensation coding mode, the prediction image is generated by the second image prediction processing (image compensation processing) which does not require the prediction assist information for generating the prediction image on the decoding side.

The coding mode determination rule, for example, can be a rule in which the compensation coding mode is adopted when the reproduced image of the processing target block is generated by the below-described image compensation processing (see FIG. 6, second image prediction processing) and the value obtained by raising the error between the input image of the processing target block and the reproduced image to the second power is equal to or less than a threshold value, and the prediction coding processing mode is adopted in other cases. Further, it is not always necessary to compare the error raised to the second power with the threshold value, and the absolute value of the error may be compared with a threshold value. Another coding mode determination rule, for example, can be a rule in which the information defining a block that will be coded in a prediction coding processing mode and a block that will be encoded in a compensation coding mode is held corresponding to the block position information in advance, and the coding mode corresponding to the processing target block is acquired based on the block position information when the processing is performed.

The prediction image generation unit 13 selects from the below-described nine prediction image generation patterns an intra-frame prediction image generation pattern, that is, a prediction mode employed for generation of the prediction image corresponding to the input image of the processing target block by the first image prediction processing when the coding mode is a prediction coding processing mode, and outputs the prediction mode information for specifying this prediction mode. That is, this intra-frame prediction image generation pattern (prediction mode) becomes the prediction assist information which is necessary for generation of the prediction image in the decoding side.

The prediction image generation unit 13 uses part of the reproduced image that has already been coded, reproduced and stored in the storage unit 19, among the images of each block, according to the determined prediction image generation pattern, thereby generating the prediction image corresponding to the input image of the processing target block. The first image prediction processing for generation of the prediction image will be described below in detail.

The subtraction unit 14 subtracts, in pixel units, the prediction image of the processing target block from the input image of the processing target block, thereby generating the prediction residual image.

The transformation unit 15 transforms the prediction residual image by using the predetermined transformation rule and outputs the transformation coefficient (transformation information) obtained by this transformation. The predetermined transformation rule, for example, can be a 4-row-4-column two-dimensional DCT, or also a 4-row-4-column orthogonal transformation and quantizing employed in H.264. Further, for example, The predetermined transformation rule can be a transformation operation and quantization such as a Matching Pursuit, a vector quantizing, and a wavelet transformation.

The encoding unit 16 conducts the entropy encoding of transformation coefficients based on the predetermined rule. Furthermore, the encoding unit 16 executes the entropy encoding of the coding mode information and prediction image generation pattern (prediction mode) based on the predetermined rule. For example, arithmetic encoding can be used as the entropy encoding.

The inverse transformation unit 17 generates the restored prediction residual image by executing inverse transformation of the transformation coefficients by using the predetermined inverse transformation rule. The predetermined inverse transformation rule is an inverse transformation rule corresponding to the predetermined transformation rule employed by the transformation unit 15.

The addition unit 18 generates a reproduced image by adding the prediction image of the processing target block and the restored prediction residual image corresponding to the prediction image. Further, the addition unit 18 may also execute the clipping processing, so that the pixel value is fit within a specific range when the specific range is set for the pixel value of the image.

The storage unit 19 stores the reproduced image generated by the addition unit 18 in a memory (not shown in the figures).

The first image prediction processing executed for generation of the prediction image will be explained below with reference to FIG. 2 and FIG. 3. In the present embodiment, the first image prediction processing is an intra-frame prediction processing, but a variety of prediction processing operations, for example, such as a motion compensation prediction processing, can be employed for the first image prediction processing.

Figure 2:
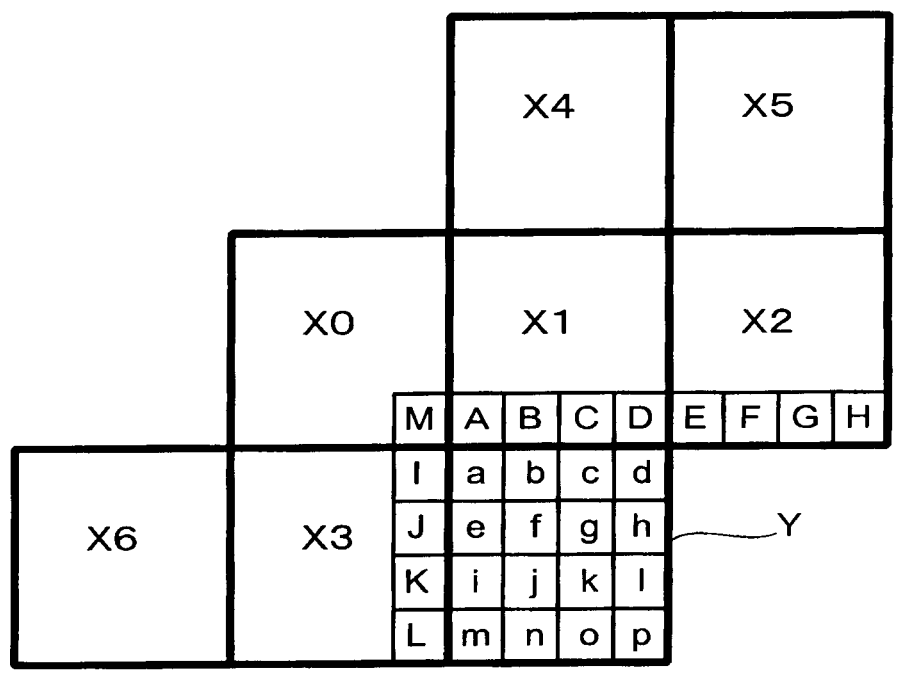
FIG. 2 shows an explanatory diagram for the contents of image prediction processing.

First, as shown in FIG. 2, a block adjacent to a processing target block Y consisting of 4×4 pixels from above and diagonally to the left is denoted as a block X0, a block adjacent to the upper side is denoted as a block X1, a block adjacent from above and on the right is denoted as a block X2, and the block adjacent to the left side is denoted as block X3. Further, a block adjacent to the upper side of block X1 is denoted as a block X4, a block adjacent to the upper side of the block X2 is denoted as a block X5, and a block adjacent to the left side of the block X3 is denoted as a block X6. Further, the reproduced pixel values in the lower most row of the block X1 are denoted as A, B, C, D from left to right, the reproduced pixel values in the lowermost row of the block X2 are denoted as E, F, G, H in the order from the left, and the reproduced pixel values in the rightmost column of the block X3 are denoted as I, J, K, L in the order from the top. Further, the reproduced pixel value in the lower right corner of the block X0 is denoted by M. Moreover, the pixel values of the prediction images in the processing target block Y are denoted by a, b, c, d, e, f, g, h, i, j, k, l, m, n, o, p in the order of raster scanning.

The nine prediction modes A0 through A8 for encoding the 4×4-pixel block will be described below with reference to FIG. 3. The prediction mode A0 shown in (a) of FIG. 3 is a mode in which the prediction image is generated by linearly extending downward the pixel values adjacent to the upper side of the processing target block. In this prediction mode A0, the prediction image is generated based on the following formulas.

$a=e=i=m=A$ $b=f=j=n=B$ $c=g=k=o=C$ $d=h=l=p=D$

Figure 3:
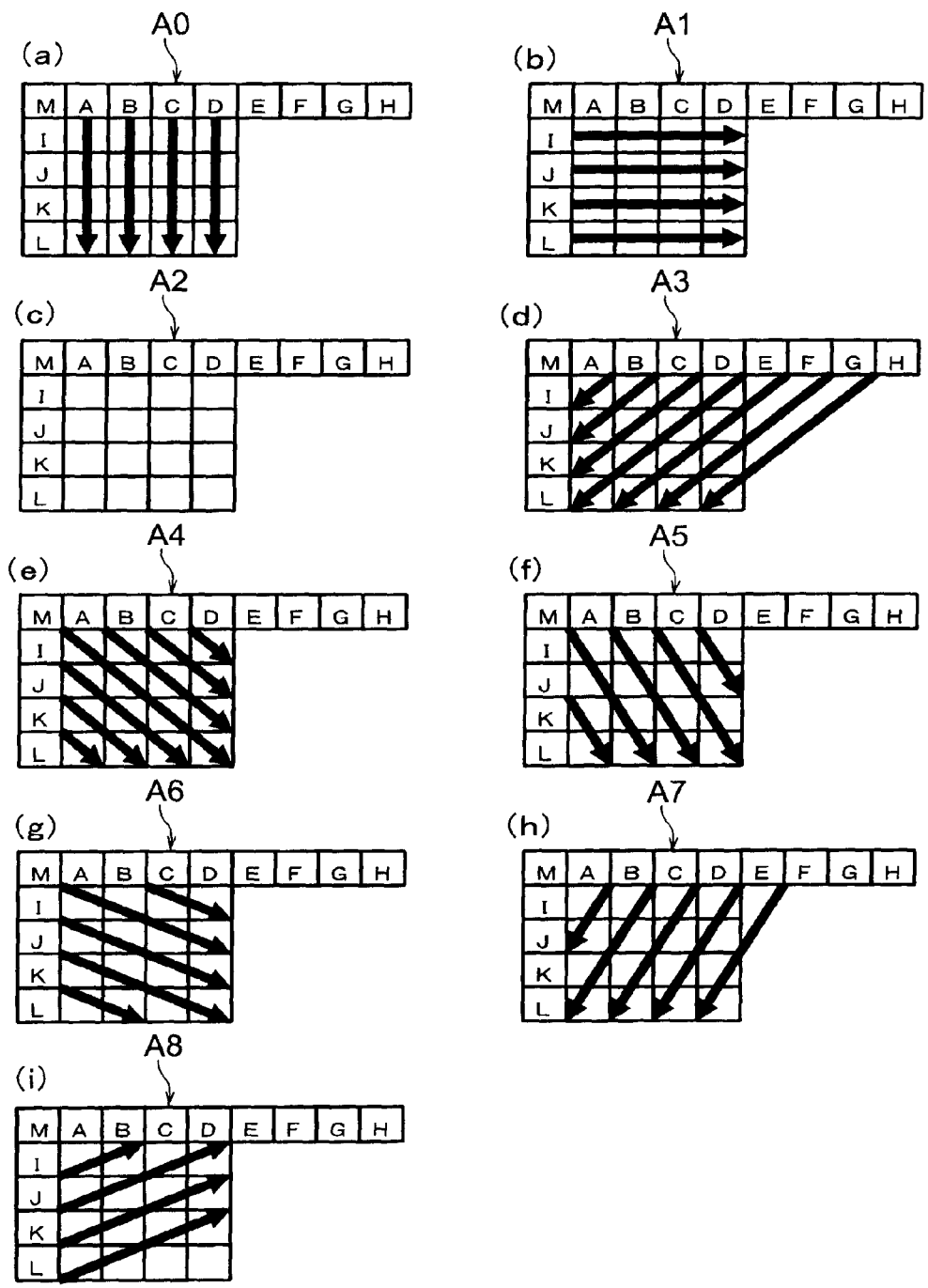
FIG. 3 shows an explanatory diagram for the contents of image prediction processing.

The prediction mode A1 shown in (b) of FIG. 3 is a mode in which the prediction image is generated by linearly extending rightward the pixel values adjacent to the left side of the processing target block. In this prediction mode A1, the prediction image is generated based on the following formulas.

$a=b=c=d=I$ $e=f=g=h=J$ $i=j=k=l=K$ $m=n=o=p=L$

The prediction mode A2 shown in (c) of FIG. 3 is a mode in which only DC components of the processing target block are predicted by using the average values of the surrounding pixels. In this prediction mode A2, the prediction image is generated based on the following rule. First, when all of the A to M are the reproduced pixels within the frame, the values of all the a to p are taken as $(A+B+C+D+I+J+K+L+4)/8$. By contrast, when A to D do not belong to the reproduced block in the frame and I to L belong to the reproduced block in the frame, the values of all the a to p are taken as $(I+J+K+L+2)/4$. Furthermore, when I to L do not belong to the reproduced block in the frame and A to D belong to the reproduced block in the frame, the values of all the a to p are taken as $(A+B+C+D+2)/4$. Furthermore, when all the A to D and I to L do not belong to the reproduced block in the frame, the values of all the a to p are taken as 128.

The prediction mode A3 shown in (d) of FIG. 3 is a mode in which the prediction image is generated by linearly extending downward and diagonally to the left the pixel values adjacent to the upper side and located at the top and diagonally to the right of the processing target block. In this prediction mode A3, the prediction image is generated based on the following formulas.

$a=(A+2B+C+2)/4$ $b=e=(B+2C+D+2)/4$ $c=f=i=(C+2D+E+2)/4$ $d=g=j=m=(D+2E+F+2)/4$ $h=k=n=(E+2F+G+2)/4$ $l=o=(F+2G+H+2)/4$ $p=(G+3H+2)/4$

The prediction mode A4 shown in (e) of FIG. 3 is a mode in which the prediction image is generated by linearly extending downward and diagonally to the right the pixel values adjacent to the left side, upper side, and the top left diagonal corner of the processing target block. In this prediction mode A4, the prediction image is generated based on the following formulas.

$$m=(J+2K+L+2)/4$$

$$i=n=(I+2J+K+2)/4$$

$$e=j=o=(M+2I+J+2)/4$$

$$a=f=k=p=(A+2M+I+2)/4$$

$$b=g=l=(M+2A+B+2)/4$$

$$c=h=(A+2B+C+2)/4$$

$$d=(B+2C+D+2)/4$$

The prediction mode A5 shown in (f) of FIG. 3 is a mode in which the prediction image is generated by linearly extending downward and rightward the pixel values adjacent to the left side, upper side, and the top left diagonal corner of the processing target block. In this prediction mode A5, the prediction image is generated based on the following formulas.

$$a=j=(M+A+1)/2$$

$$b=k=(A+B+1)/2$$

$$c=l=(B+C+1)/2$$

$$d=(C+D+1)/2$$

$$f=o=(M+2A+B+2)/4$$

$$g=p=(A+2B+C+2)/4$$

$$h=(B+2C+D+2)/4$$

$$i=(M+2I+J+2)/4$$

$$m=(I+2J+K+2)/4$$

The prediction mode A6 shown in (g) of FIG. 3 is a mode in which the prediction image is generated by linearly extending downward and rightward the pixel values adjacent to the left side, upper side, and the top left diagonal corner of the processing target block. In this prediction mode A6, the prediction image is generated based on the following formulas.

$$a=g=(M+I+1)/2$$

$$b=h=(I+2M+A+2)/4$$

$$c=(M+2A+B+2)/4$$

$$d=(A+2B+C+2)/4$$

$$e=k=(I+J+1)/2$$

$$f=l=(M+2I+J+2)/4$$

$$i=o=(J+K+1)/2$$

$$j=p=(I+2J+K+2)/4$$

$$m=(K+L+1)/2$$

$$n=(J+2K+L+2)/4$$

The prediction mode A7 shown in (h) of FIG. 3 is a mode in which the prediction image is generated by linearly extending downward and leftward the pixel values adjacent to the upper side and located on the top to the right of the processing target block. In this prediction mode A7, the prediction image is generated based on the following formulas.

$$a=(A+B+1)/2$$

$$b=i=(B+C+1)/2$$

$$c=j=(C+D+1)/2$$

$$d=k=(D+E+1)/2$$

$$l=(E+F+1)/2$$

$$e=(A+2B+C+2)/4$$

$$f=m=(B+2C+D+2)/4$$

$$g=n=(C+2D+E+2)/4$$

$$h=o=(D+2E+F+2)/4$$

$$p=(E+2F+G+2)/4$$

The prediction mode A8 shown in (i) of FIG. 3 is a mode in which the prediction image is generated by linearly extending upward and rightward the pixel values adjacent to the left side of the processing target block. In this prediction mode A8, the prediction image is generated based on the following formulas.

$$a=(I+J+1)/2$$

$$b=(I+2J+K+2)/4$$

$$c=e=(J+K+1)/2$$

$$d=f=(J+2K+L+2)/4$$

$$g=i=(K+L+1)/2$$

$$h=j=(K+3L+2)/4$$

$$k=l=m=n=o=p=L$$

Of the above-described prediction modes, the prediction image generation unit 13 does not select the prediction mode in which even one reproduced pixel value, which is used when a prediction image is generated, is outside the frame.

Here, in the present embodiment, when the coding mode of the block comprising any of A to M is the compensation coding mode, the prediction image has not been generated. Therefore, in this case, no reproduced pixel value exists.

In the present embodiment, in such a case the reproduced pixel values that are the closest to the processing target block and that are the reproduced pixel values within the same frame present in the direction of prediction origin (the starting point side of the arrows shown in FIG. 3) and on the line in the prediction direction (direction of the arrows shown in FIG. 3) in the prediction mode will be used as the substitution pixel values of A to M for the generation of the prediction image. Furthermore, when a straight line in the prediction direction passes between two pixels, the average pixel value of the two pixels will serve as the substitution pixel value.

Figure 4:
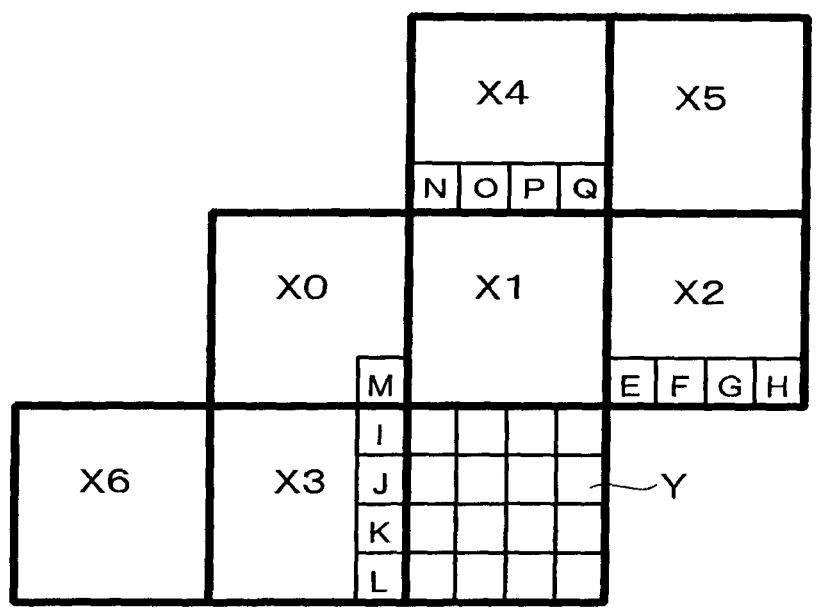
FIG. 4 shows an explanatory diagram for substitution pixel values.

The above-described substitution pixel values will be described below with reference to FIG. 4 and FIG. 5. First, FIG. 4 illustrates the substitution pixel value determined when the block X1 adjacent to the upper side of the processing target block Y is a compensation coding mode and the prediction mode is A0. As shown in FIG. 4, the reproduced pixel values N, O, P, Q located in the lowermost row of the block X4 are selected as the substitution pixel values of the reproduced pixel values A, B, C, D of the block X1. Thus, for the reproduced pixel values A, B, C, D there are selected the reproduced pixel values N, O, P, Q which are the closest to the processing target block Y and are the reproduced pixel values within the same frame present in the direction of prediction origin and on the line in the prediction direction in the prediction mode A0. Therefore, when the prediction image of the processing target block Y shown in FIG. 4 is generated, N, O, P, Q are used instead of A, B, C, D present in the formulas relating to the above-described prediction mode A0. Furthermore, when the block X4 is outside the frame or the compensation coding mode, A, B, C, D are handled as being outside the frame. Thus, A0 is not selected as the prediction mode.

Figure 5:
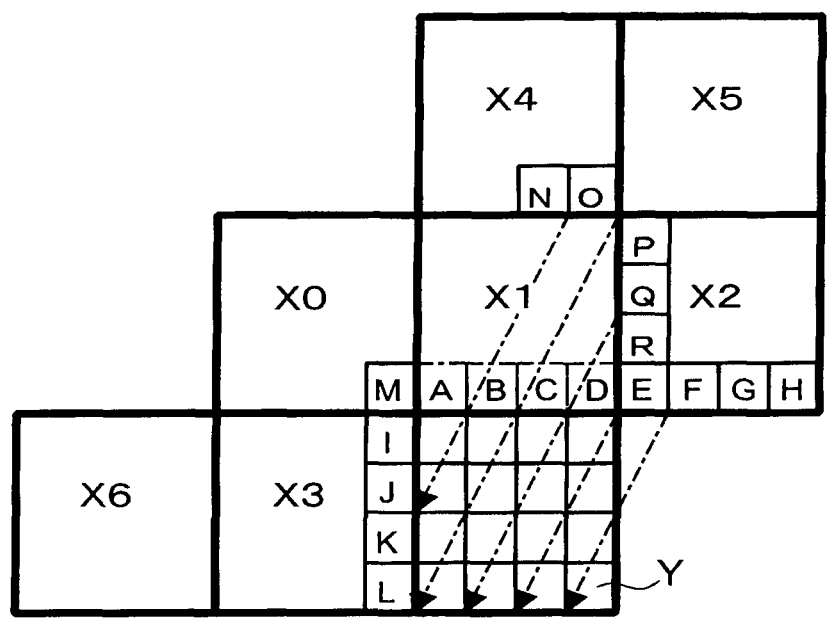
FIG. 5 shows an explanatory diagram for the substitution pixel values.

Further, FIG. 5 shows the substitution pixel values determined when the block X1, which is adjacent to the upper side of the processing target block Y, is the compensation coding mode and the prediction mode is A7. As shown in FIG. 5, the two reproduced pixel values N, O located in the lowermost row of the block X4 and the two reproduced pixel values P, Q located in the leftmost column of the block X2 are selected as the candidates for the substitution pixel values of the reproduced pixel values A, B, C, D of the block X1. Further, N is selected as the substitution value of A, O is selected as the substitution value of B, P is selected as the substitution value of D, and the average value of O and P is used as the substitution value of C. The average value of O and P is used as the substitution value of C because the straight line in the prediction direction passes between (on the pixel in the lower left corner of the block X5) two pixels O and P. Thus, the reproduced pixel values N, O (O+P)/2, Q, which are the closest to the processing target block Y, are selected as the reproduced pixel values in the same frame present in the prediction origin direction and on a straight line in the prediction direction in the prediction mode A7 as the reproduced pixel values A, B, C, D. Therefore, when the prediction images of the processing target block Y shown in FIG. 5 are generated, N, O, (O+P)/2, Q are used instead of the A, B, C, D in the formulas of the above-described prediction mode A7. Further, when the average value of the two pixel values is computed in binary numbers, the two pixel values may be added, 1 may be added to the addition result, and then the result may be shifted 1 bit to the right.

The optimum reproduced pixel values matching each prediction mode can thus be selected from the non-adjacent blocks by determining the substitution pixel values.

The image compensation processing (second image prediction processing) executed during generation of compensation image which is conducted in the above-described coding mode determination rule will be explained below with reference to FIG. 6.

Figure 6:
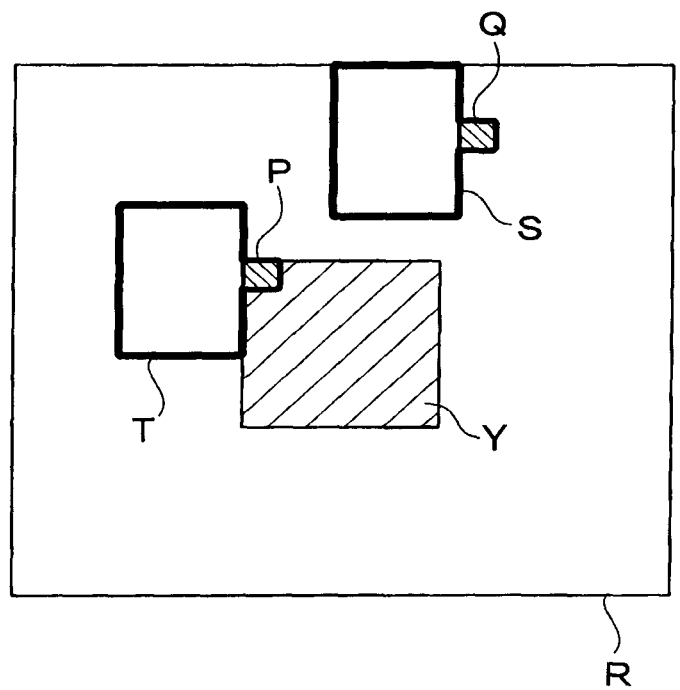
FIG. 6 shows an explanatory diagram for the contents of image compensation processing.

In the image compensation processing of the present embodiment, one pixel contained in the processing target block Y is taken as a processing target pixel P, as shown in FIG. 6. An area comprising this processing target pixel P and a pixel (reproduced pixel) of the reproduced image present close to the processing target pixel P is considered as a template T. When a pixel (compensated pixel) already-subjected to image compensation processing is present in the processing target block Y, this pixel already-subjected to image compensation processing can be contained in the template T. Further, the processing target block Y and an area surrounding the processing target block Y are considered as the target area R.

First, the processing target pixel P is selected from a plurality of pixels contained in the processing target block Y by scanning inside the processing target block Y based on the predetermined scanning rule. Then, a template T is determined based on the selected processing target pixel P. Then, a correlation area S with the highest correlation with the pixels of the portion obtained by removing the processing target pixel P from the template T is selected among the areas having the same shape as the template T inside the target area R. Then, the pixel value of the reproduced pixel Q corresponding to the processing target pixel P within the correlation area S is set as the compensated pixel value in the processing target pixel P. The processing similar to the above-described processing is performed in the scanning order with respect to each pixel contained in the processing target block Y. Thus, the compensation image for the processing target block Y is generated. Here, for example, a method in which the pixels with a minimum square sum of the differences between the corresponding pixel values are considered to have the highest correlation, a method in which the pixels with a minimum sum of absolute values of the differences between the corresponding pixel values are considered to have the highest correlation, and any other methods by which the correlation can be calculated can be employed as the method for computing the correlation when the aforementioned correlation area S is selected. Further, when the coding target image is a video, more efficient image compensation can be performed by using the decoded pixels and compensated pixels in the already-decoded frame as the target area R.

Figure 7:
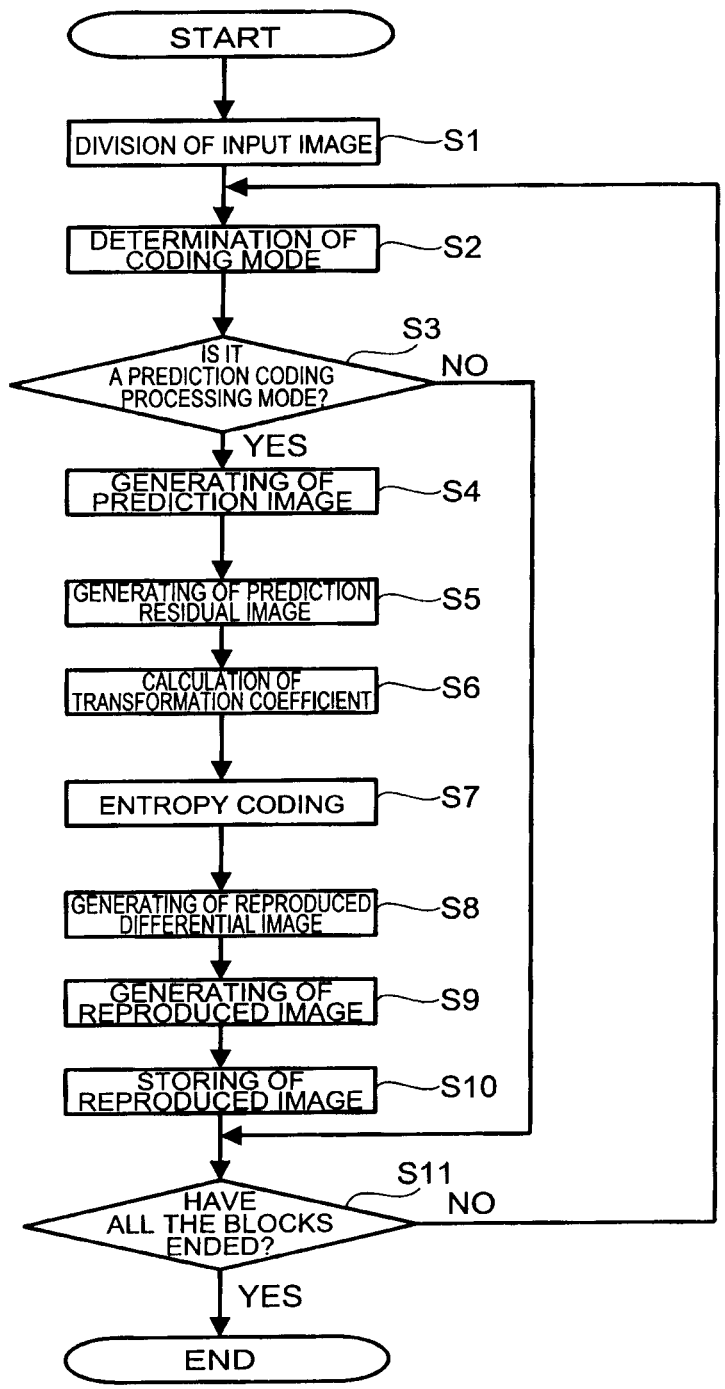
FIG. 7 is a flowchart illustrating an operation of the image encoding apparatus in an image encoding processing.

The operation of the image encoding apparatus 1 during image encoding processing will be explained below with reference to FIG. 7. This image encoding processing is executed in block units read in the predetermined scanning order (for example, a raster scanning order) from one frame.

First, the image division unit 11 divides the input image that was inputted into a frame unit into blocks of the predetermined size (for example, 4×4 pixels) and generates block position information for determining each processing target block (step S1).

Then, the coding mode determination unit 12 determines the coding mode during encoding of the image of the processing target block as either a prediction coding processing mode (P mode) or a compensation coding mode (C mode), based on the predetermined coding mode determination rule and outputs coding mode information for determining the coding mode (step S2). This coding mode information of the block is outputted to the image division unit 11, prediction image generation unit 13, and encoding unit 16.

Then, the prediction image generation unit 13 makes a decision as to whether the coding mode of the processing target block determined by the coding mode determination unit 12 is the prediction coding processing mode or not (step S3). If the decision result is NO (step 3; NO), then the processing shifts to step S11 to execute the image encoding processing of the next processing target.

On the other hand, if in step S3 a decision was made that the coding mode of the processing target block is the prediction coding processing mode (step S3; YES), then the prediction image generation unit 13 determines the prediction mode and generates the prediction image corresponding to the image of the processing target block by using part of the reproduced image that has already been encoded and stored in the storage unit 19, according to this determined prediction mode (step S4). That is, the prediction image generation unit 13 generates the prediction image based on the adjacent blocks, which are adjacent to the processing target block, and non-adjacent blocks, which are not adjacent to the processing target block, by executing the above-described first image prediction processing. The prediction image is outputted to the subtraction unit 14 and addition unit 18.

Then, the subtraction unit 14 subtracts the prediction image corresponding to the image of the processing target block from the image (input image) of the processing target block, thereby generating the prediction residual image (step S5). This prediction residual differential image is outputted to the transformation unit 15.

Then, the transformation unit 15 transforms the prediction residual image generated by the subtraction unit by using the predetermined transformation rule, thereby generating a transformation coefficient (transformation information) obtained by this transformation (step S6). The transformation coefficient is outputted to the encoding unit 16 and inverse transformation unit 17.

Then, the encoding unit 16 executes the entropy encoding of the transformation coefficient, which was calculated by the transformation unit 15, based on the predetermined rule (step S7). Furthermore, the encoding unit also executes the entropy encoding of the coding mode information, which was determined in step S2, based on the predetermined rule and executes the entropy encoding of the prediction image generation pattern, which was selected in step S4, based on the predetermined rule. Those encoded data that were obtained by entropy encoding are outputted as compression data (bit stream) to an external image decoding apparatus.

Then, the inverse transformation unit 17 executes the inverse transformation of the transformation coefficient, which was computed by the transformation unit 15, by using an inverse transformation rule corresponding to the predetermined transformation rule employed by the transformation unit 15, thereby generating the restored prediction residual image (step S8). The restored prediction residual image is outputted to the addition unit 18.

Then, the addition unit 18 generates a reproduced image by adding the prediction image generated by the prediction image generation unit 13 and the restored prediction residual differential image generated by the inverse transformation unit 17 (step S9). This reproduced image is stored and accumulated in the memory by the storage unit 19 (step S10).

Then, a decision is made as to whether the processing has been completed with respect to all the blocks (step S11). When it was completed for all the blocks (step S11; YES), the image encoding processing is ended. On the other hand, if the processing has not been completed with respect to all the blocks (step S11; NO), the processing shifts to step S2.

The image encoding program of the preferred embodiment of the present invention and a computer-readable recording medium having recorded thereon this image encoding program (referred to hereinbelow simply as "recording medium") will be explained below. The recording medium as referred to herein is capable of inducing an energy (magnetic, optical, electric, and the like) variation state according to the description contents of a program with respect to a reading device provided as a hardware source of a computer and transferring the description contents of the program to a reading device in the form of signals corresponding to those variations. For example, magnetic disks, optical disks, CD-ROM, and memory incorporated in a computer can be used as such recording medium.

Figure 8:
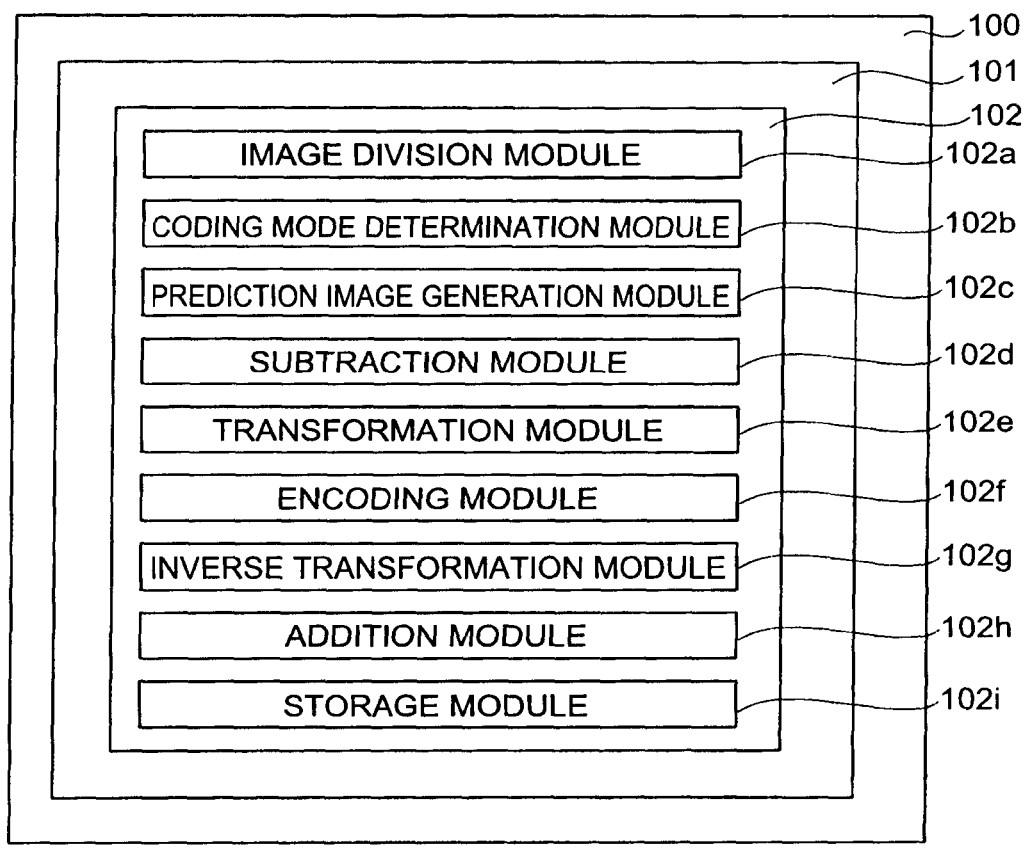
FIG. 8 is a diagram showing the structure of a recording medium for recording an image encoding program.

FIG. 8 is a structural diagram of the recording medium of the first embodiment. A recording medium 100, as shown in FIG. 8, comprises a program area 101 for recording a program. An image encoding program 102 is recorded in this program area 101.

Figure 14:
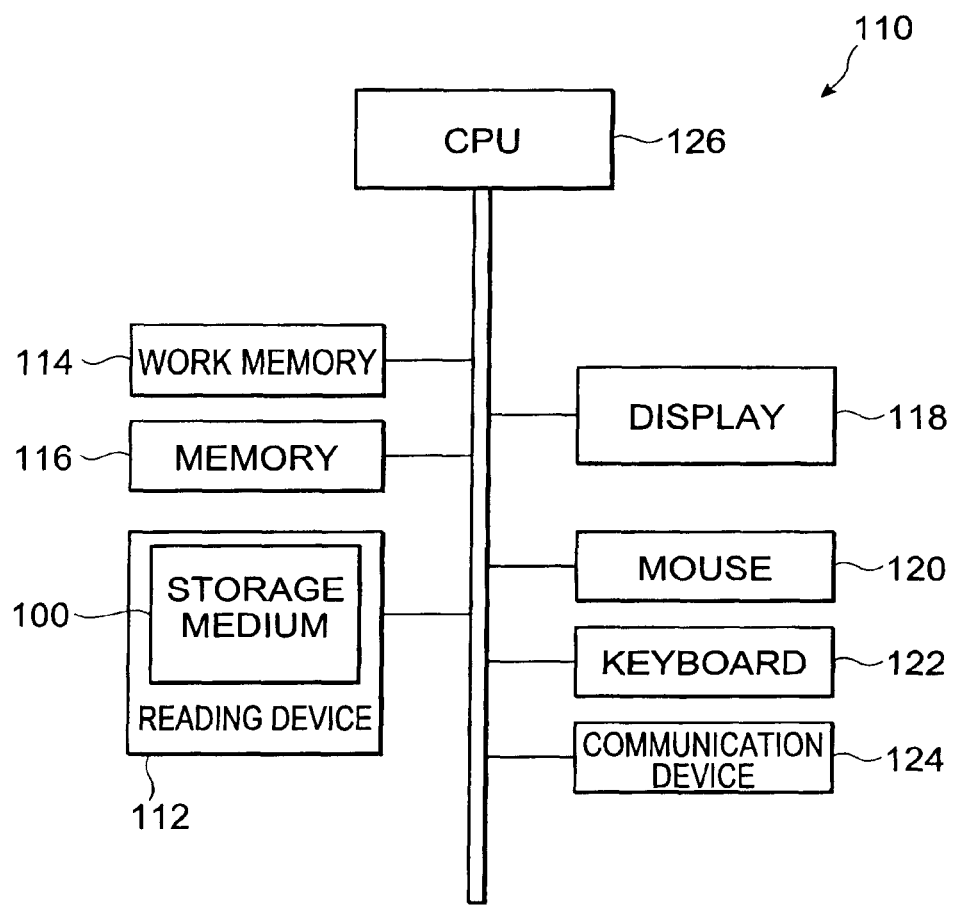
FIG. 14 is a diagram showing a hardware structure of a computer for executing a program recorded in the recording medium.
Figure 15:
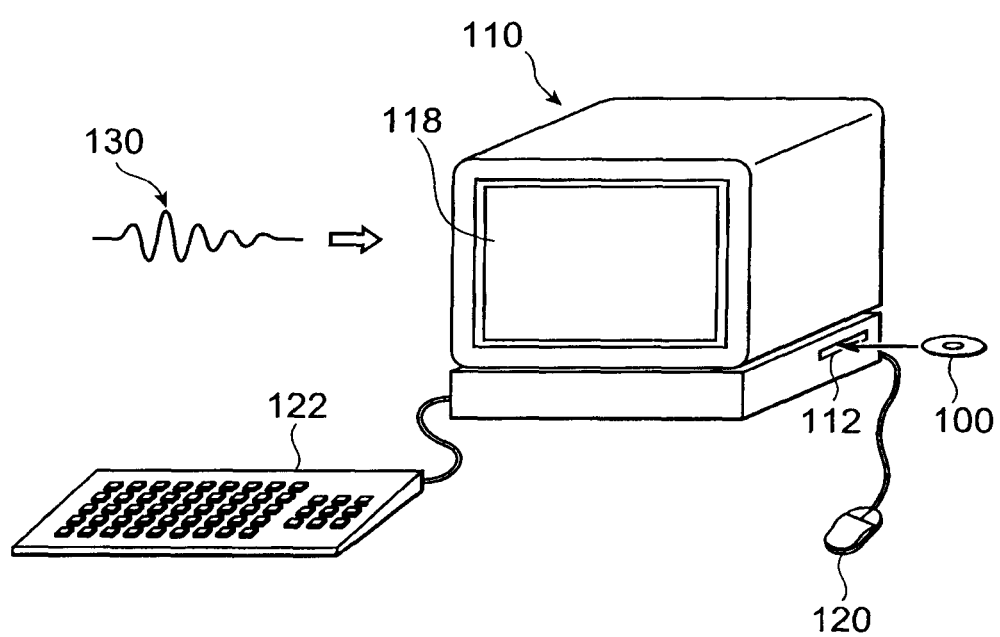
FIG. 15 is a perspective view of the computer for executing a program recorded in the recording medium.

FIG. 14 is a diagram showing a hardware structure of a computer for executing the program stored in the recording medium. FIG. 15 is a perspective view of the computer for executing the program stored in the recording medium. As shown in FIG. 15, a computer 110 comprises a reading device 112 such as a floppy disk drive device, CD-ROM drive device, or DVD drive device, an work memory (RAM) 114 permanently storing an operating system, a memory 116 for recording a program stored in the recording medium 100, a display device 118 such as a display, a mouse 120 and a keyboard 122 serving as input devices, a communication device 124 for transmitting and receiving data or the like, and a CPU 126 for controlling the execution of the program.

If the recording medium 100 is inserted in the reading device 112, the computer 110 can access the image encoding program 102 stored in the recording medium 100 from the reading device 112 and can operate as the image encoding apparatus 1 due to this image encoding program 102.

As shown in FIG. 15, the image encoding program 102 may be provided via a network as a computer data signal 130 superimposed on a carrier wave. In this case, the computer 110 can store the image encoding program 102 received by the communication device 124 in the memory 116 and execute the image encoding program 102.

The image encoding program 102 is composed of an image division module 102a, a coding mode determination module 102b, a prediction image generation module 102c, a subtraction module 102d, a transformation module 102e, an encoding module 102f, an inverse transformation module 102g, an addition module 102h, and a storage module 102i. Here, the functions implemented by operating the image division module 102a, coding mode determination module 102b, prediction image generation module 102c, subtraction module 102d, transformation module 102e, encoding module 102f, inverse transformation module 102g, addition module 102h, and storage module 102i are identical to the functions of the image division unit 11, coding mode determination unit 12, prediction image generation unit 13, subtraction unit 14, transformation unit 15, encoding unit 16, inverse transformation unit 17, addition unit 18, and storage unit 19 of the above-described image encoding apparatus 1.

According to the image encoding apparatus 1 of the first embodiment, a bit stream with a high encoding efficiency is generated with respect to an area for which the coding mode is a compensation coding mode because it is not necessary to incorporate the data based on the prediction assist information into the bit stream.

Further, when the coding mode of the adjacent blocks, which are adjacent to the processing target block, is a compensation coding mode, the prediction image generation unit 13 can generate prediction image by using the reproduced images of non-adjacent blocks, which are not adjacent to the processing target block. As a result, the prediction images can be generated by using not only the reproduced images of the adjacent blocks, which are adjacent to the processing target block, but also the reproduced images of the non-adjacent blocks, which are not adjacent to the processing target block. Therefore, the reference range during prediction image generation can be expanded and spatial redundancy can be reduced. Moreover, the encoding efficiency can be further increased. Furthermore, by the efficient selection of images of the compensation coding mode, it is possible to expand effectively the reference range during prediction image generation and to reduce further the spatial redundancy.

Second Embodiment

The second embodiment of the present invention will be described below. This image decoding apparatus receives the compressed data (including encoded data) outputted from the image encoding apparatus of the first embodiment, that is, the bit stream, decodes the received bit stream, and generates the reproduced image data.

Figure 9:
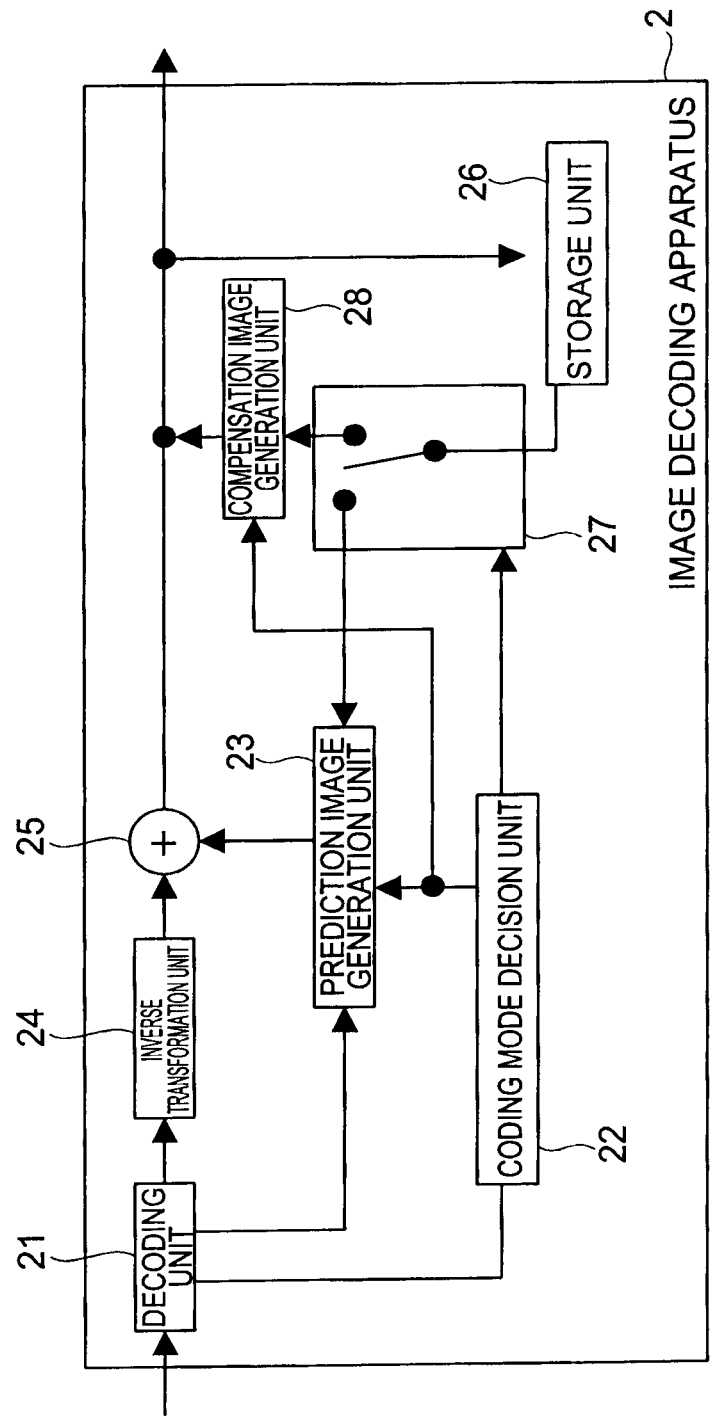
FIG. 9 is a diagram showing a configuration of an image decoding apparatus of a second embodiment.

FIG. 9 is a diagram showing the configuration of the image decoding apparatus of the second embodiment. An image decoding apparatus 2 shown in FIG. 9 physically can be a computer comprising, for example, a CPU (central processing unit), a storage unit such as a memory, a display device such as a display, and a communication device. Furthermore, the image decoding apparatus 2 can be a mobile communication terminal such as a cellular phone, a DVD device, and the like.

The image decoding apparatus 2 shown in FIG. 9 comprises a decoding unit (decoding means) 21, a coding mode decision unit 22, a prediction image generation unit (first image prediction means) 23, an inverse transformation unit (inverse transformation means) 24, an addition unit (reproduced image generation means) 25, a storage unit (storage means) 26, a toggle switch 27, and a compensation image generation unit (second image prediction means) 28.

Each structural element shown in FIG. 9 will be described below. The decoding unit 21 receives the input image information (compressed data) relating to the input image which is the target of decoding processing divided into blocks of the predetermined size. The decoding unit 21 executes entropy decoding of the received input image information based on the predetermined rule. As a result of this entropy decoding, the transformation coefficient, coding mode information, and prediction mode information are decoded. Those transformation coefficient, coding mode information, and prediction mode information are identical to the transformation coefficient of the differential image data, coding mode information, and prediction mode information, which are explained with reference to the image encoding apparatus 1, and the explanation thereof is therefore omitted.

The coding mode decision unit 22 decides whether the coding mode is a prediction coding processing mode or a compensation coding mode from the inputted coding mode information in the predetermined scanning order (for example, raster scanning order).

Here, the processing executed on the basis of the decision result of the coding mode decision unit 22 differs depending on whether the scanning in the frame is of the first cycle or second cycle. More specifically, when the coding mode was decided to be the prediction coding processing mode at the time the scanning in the frame was of the first cycle, the prediction image decoding processing including the aforementioned first image prediction processing is executed with respect to the processing target block, and when the coding mode was decided to be the compensation coding mode, the next block is read. On the other hand, when the coding mode was decided to be the compensation coding mode at the time the scanning in the frame was of the second cycle, the compensation image decoding processing including the above-described image compensation processing is executed with respect to the processing target block, and when the coding mode was decided to be the prediction coding processing mode, the next block is read. Thus, in the first cycle, the prediction image decoding processing including the image prediction processing is executed only with respect to the processing target block that is the prediction coding processing mode, and in the second cycle, the compensation image decoding processing including the image compensation processing is executed only with respect to the processing target block that is the compensation coding mode.

The prediction image generation unit 23 generates the prediction image of the processing target block that is the target of decoding processing by using part of the reproduced image that has already been decoded and stored in the storage unit 26, of the images of each block, according to the prediction mode specified by the decoded prediction mode information. The image prediction processing for generating this prediction image is identical to the above-described first image prediction processing (see FIGS. 2 and 3) and the explanation thereof is, therefore, omitted.

The inverse transformation unit 24 executes the inverse transformation by using the inverse transformation rule corresponding to the predetermined transformation rule employed by the above-described transformation unit 15, thereby generating the restored prediction residual image obtained by the inverse transformation with respect to the decoded transformation coefficients.

The addition unit 25 adds the prediction image to the restored prediction residual image corresponding to this prediction image, thereby generating the reproduced image. Further, the addition unit 25 may also execute a clipping processing so as to fit the pixel values in the specific range when the specific range is set for the pixel values of the images.

The storage unit 26 stores the reproduced images generated by the addition unit 25 in a memory (not shown in the figures).

The toggle switch 27 switches the transmission destination of the reproduced image stored in the storage unit 26 according to the coding mode of the processing target block. That is, the toggle switch 27 switches the switch so that the reproduced image stored in the storage unit 26 can be transmitted to the prediction image generation unit 23 when the coding mode is the prediction coding processing mode. On the other hand, when the coding mode is the compensation coding mode, the switch is so switched that the reproduced image stored in the storage unit 26 can be transmitted to the compensation image generation unit 28.

The compensation image generation unit 28 generates the compensation image by using the reproduced image that has already been decoded in the vicinity of the processing target block. Here, the image compensation processing executed for generation of the compensation image is identical to the above-described image compensation processing (see FIG. 6, second image prediction processing) and the explanation thereof is, therefore, omitted.

Figure 10:
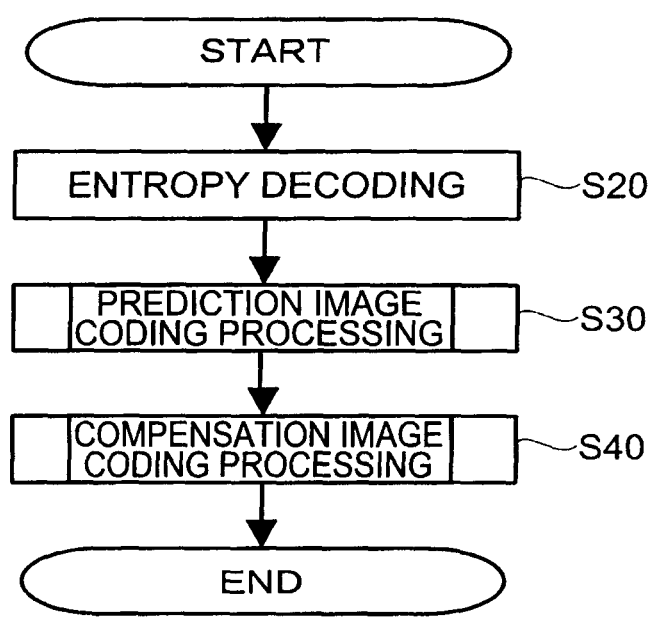
FIG. 10 is a flowchart illustrating the general operation of image decoding processing.
Figure 11:
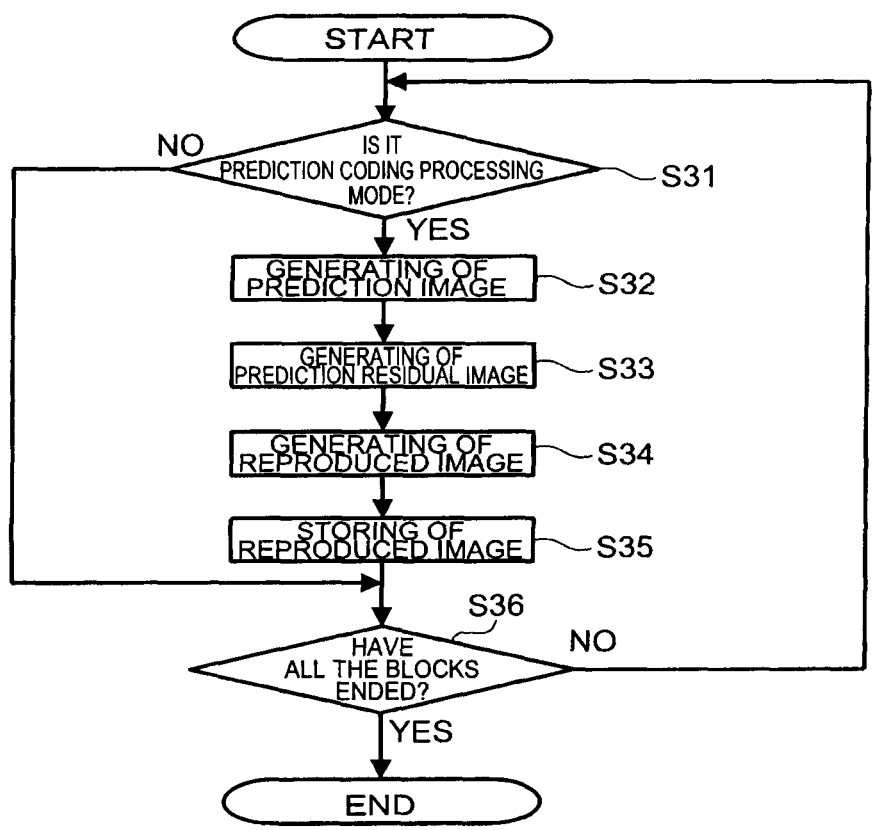
FIG. 11 is a flowchart illustrating the operation of prediction image decoding processing.
Figure 12:
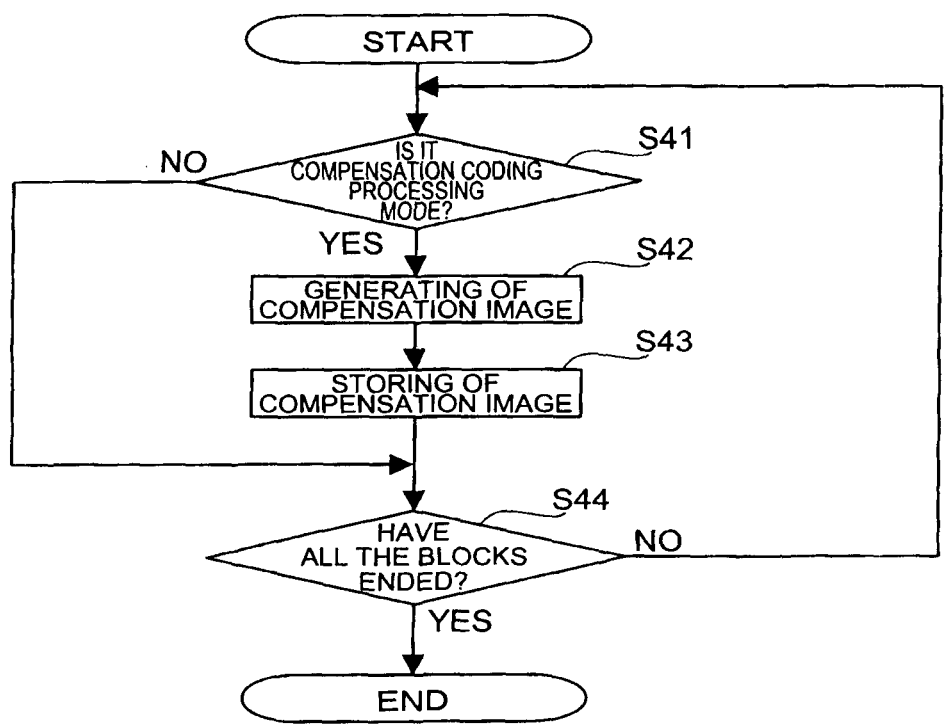
FIG. 12 is a flowchart illustrating the operation of compensation image decoding processing.

The operation of the image decoding apparatus 2 and the image decoding processing will be described below with reference to FIGS. 10 to 12. First, a schematic operation during image decoding processing will be explained with reference to FIG. 10. As shown in FIG. 10, in the image decoding processing, first, the input image information for one frame received from the image encoding apparatus 1 of the first embodiment is entropy decoded by the decoding unit 21 based on the predetermined rule, whereby a transformation coefficient, coding mode information, and prediction mode information are generated (step S20). Then, the prediction image decoding processing executed in the intra-frame scanning of the first cycle (step S30) is performed and then the compensation image decoding processing executed in the intra-frame scanning of the second cycle (step S40) is performed.

Each operation of the prediction image decoding processing (step S30) and compensation image decoding processing (step S40) will be described hereinbelow in greater detail for each processing separately.

First, the operation of the prediction image decoding processing will be explained in detail with reference to FIG. 11. First, the coding mode decision unit 22 makes a decision as to whether the coding mode specified by the inputted coding mode information is the prediction coding processing mode, according to the predetermined scanning order (for example, a raster scanning order) (step S31). When the decision result is NO (step S31; NO), the processing makes a transition to the below-described step S36.

On the other hand, if a decision of step S31 is that the coding mode is the prediction coding processing mode (step S31; YES), then the prediction image generation unit 23 generates the prediction image of the processing target block by using part of the reproduced images that have already been decoded and stored in the storage unit 26 of the images of each block on the basis of the prediction mode specified by the prediction mode information decoded in the above-described step S20 (See FIG. 10) (step S32). Further, the method for generating the prediction image is based on the above-described first image prediction processing. The prediction image is outputted to the addition unit 25.

Then, the inverse transformation unit 24 executes the inverse transformation by using the inverse transformation rule corresponding to the predetermined transformation rule employed in the above-described transformation unit 15 with respect to the transformation coefficient decoded in the above-described step S20 (see FIG. 10), thereby generating the restored prediction residual image obtained by this inverse transformation (step S33). This restored prediction residual image is outputted to the addition unit 25.

Then, the addition unit 25 generates the reproduced image by adding the prediction image generated by the prediction image generation unit 23 and the restored prediction residual differential image that was inverse transformed by the inverse transformation unit 24 (step S34). This reproduced image is stored and accumulated in the memory by the storage unit 26 (step S35).

Then, a decision is made as to whether the processing has been completed with respect to all the blocks (step S36). When it was completed for all the blocks (step S36; YES), the prediction image decoding processing is ended. On the other hand, if the processing has not been completed with respect to all the blocks (step S36; NO), the processing makes a transition to step S31.

The operation of the compensation image decoding processing (step S40 in FIG. 10) will be hereinbelow explained in detail with reference to FIG. 12. First, the coding mode decision unit 22 makes a decision as to whether the coding mode specified by the inputted coding mode information is the compensation coding processing mode, following the predetermined scanning order (for example, a raster scanning order) (step S41). When the decision result is NO (step S41; NO), the processing makes a transition to the below-described step S44.

On the other hand, if a decision in step S41 is that the coding mode is the compensation coding processing mode (step S41; YES), then the prediction image generation unit 28 generates the compensation image corresponding to the processing target block by acquiring the reproduced pixel values with the highest correlation from the reproduced image present around each processing target block and finds the compensation pixel image for each processing target pixel contained in the processing target block (step S42). Further, the method for generating the compensation image is based on the above-described image compensation processing (second image prediction processing).

Then, the compensation image generated by the compensation image generation unit 28 is stored and accumulated as the reproduced image in the memory by the storage unit 26 (step S43).

Then, a decision is made as to whether the processing has been completed with respect to all the blocks (step S44). When it was completed for all the blocks (step S44; YES), the compensation image decoding processing is ended. On the other hand, if the processing has not been completed with respect to all the blocks (step S44; NO), the processing makes a transition to the above-described step S41.

Figure 13:
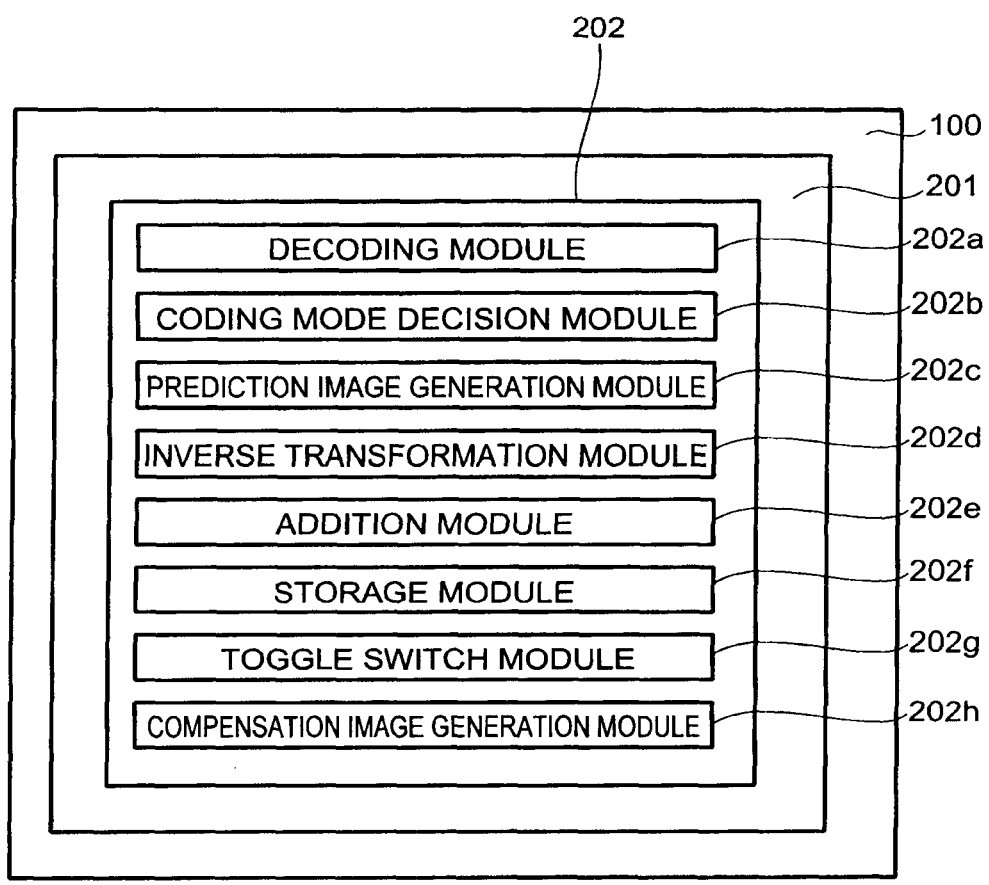
FIG. 13 is a diagram showing the structure of the recording medium for recording an image decoding program.

FIG. 13 is a structural diagram of the recording medium of the second embodiment. A recording medium 100, as shown in FIG. 13, comprises a program area 201 for recording a program. An image decoding program 202 is recorded in this program area 201.

If the recording medium 100 is inserted in the read device 112, the computer 110 (see FIG. 14 and FIG. 15) can access the image decoding program 202 stored in the recording medium 100 from the read device 112 and can operate as the image decoding apparatus 2 due to this image decoding program 202.

As shown in FIG. 15, the image decoding program 202 may be provided via a network as a computer data signal 130 superimposed on a carrier wave. In this case, the computer 110 can store the image decoding program 202 received by the communication device 124 in the memory 116 and execute the image decoding program 202.

The image encoding program 202 is composed of a decoding module 202a, a coding mode decision module 202b, a prediction image generation module 202c, an inverse transformation module 202d, an addition module 202e, a storage module 202f, a toggle switch module 202g, and a compensation image generation module 202h. Here, the functions implemented by operating the decoding module 202a, coding mode decision module 202b, prediction image generation module 202c, inverse transformation module 202d, addition module 202e, storage module 202f, toggle switch module 202g, and compensation image generation module 202h are identical to the functions of the decoding unit 21, coding mode decision unit 22, prediction image generation unit 23, inverse transformation unit 24, addition unit 25, storage unit 26, toggle switch 27, and compensation image generation unit 28 of the above-described image decoding apparatus 2.

In accordance with the image decoding apparatus 2, an image encoded with efficiency by the image encoding apparatus 1 can be decoded with good efficiency. That is, when the coding mode of the adjacent block, which is adjacent to the processing target block, is the compensation coding mode, the prediction image generation unit 23 can generate the prediction image by using the reproduced images of the non-adjacent blocks, which are not adjacent to the processing target block. As a result, the prediction images can be generated by using not only the reproduced images of the adjacent blocks, which are adjacent to the processing target block, but also the reproduced images of the non-adjacent blocks, which are not adjacent to the processing target block. Therefore, the reference range for prediction image generation can be expanded and spatial redundancy can be reduced. Therefore, the encoding efficiency can be further increased.

Further, when the coding mode is decided to be the compensation coding mode, the compensation image for compensating the reproduced image can be generated by using the reproduced image that have already been decoded. Therefore, even if no images of the compensation coding mode are transmitted during encoding, the reproduced image can be generated.

Further, in the above-described embodiment, the explanation was conducted with respect to the case in which the intra-frame encoding processing was used as the image prediction in the prediction image generation units 13, 23, but such a case is not limiting and the motion compensation prediction may be also included in the image prediction. In this case, the motion vector information is also subjected to entropy encoding. Furthermore, means identical to the motion compensation prediction in H.264 or MPEG-4 that have been used heretofore can be used as the motion compensation prediction.

Further, in the above-described embodiments, the prediction in a space area used in the H.264 has been used as the intra-frame prediction, but the intra-frame prediction is not limited thereto. For example, prediction in a frequency area implemented in MPEG-4 may be used as well.

In this case, when the blocks adjacent to the top or left side have been already encoded or decoded, all the transformation coefficients in the adjacent blocks or some of the coefficients are used as the prediction values of the transformation coefficients in the encoding or decoding target block. When both the blocks adjacent to the top side and the blocks adjacent to the left side have been already encoded or decoded, 1-bit data indicating a block where all the transformation coefficients or some of them are used as the prediction values, out of the blocks adjacent to the top or left side, is encoded as the prediction mode information. Furthermore, when any one of the blocks adjacent to the top or left side has been already encoded or decoded, all the orthogonal transformation coefficients in the encoded or decoded block or some of those coefficients are used as the prediction values.

On the other hand, when none of the blocks adjacent to the top or left side is encoded or decoded, all the orthogonal transformation coefficients in the encoded or decoded block that is present at the smallest distance from this block in the upward or leftward direction or some of those coefficients are used as the prediction values. When the encoded or decoded blocks that are present at the smallest distance from this block in the upward and leftward direction are present at the same distance in the upward and leftward direction, then 1-bit data indicating the block where all the transformation coefficients or some of them are used as the prediction values, out of the blocks present in the upward and leftward direction, is encoded as the prediction mode information. Furthermore, when all the blocks present in the upward and leftward direction of the encoded or decoded block are neither encoded nor decoded, the prediction in which only DC components are set into values (for example, 128) is executed.

Further, in each of the above-described embodiments, the operations may be implemented so that the intra-frame prediction is not executed by taking the prediction value as 0 in the intra-frame prediction. In this case, the spatial redundancy is also reduced by introducing the image compensation mode. Therefore, the encoding efficiency can be increased.

Further, in the above-described embodiments, the prediction image has been generated by using the prediction image in the same space as the frame of the processing target in the image compensation processing. However, the reproduced image of the frame with generated reproduced image that is the frame different from the frame of the processing target may be also used for the image compensation processing.

Further, in the above-described first embodiment, the prediction image generated by the image compensation processing was directly employed as the reproduced image. However, it is also possible that on the encoding side the prediction residual image of the prediction image and input image be subjected to the above-described transformation processing and entropy encoding and included in the bit stream. In this case, on the decoding side, the restored prediction residual image is generated by decoding and inverse transformation of the bit stream data, and the reproduced images are generated by adding the prediction residual image and the prediction image generated by the image compensation processing.

Third Embodiment

Figure 16:
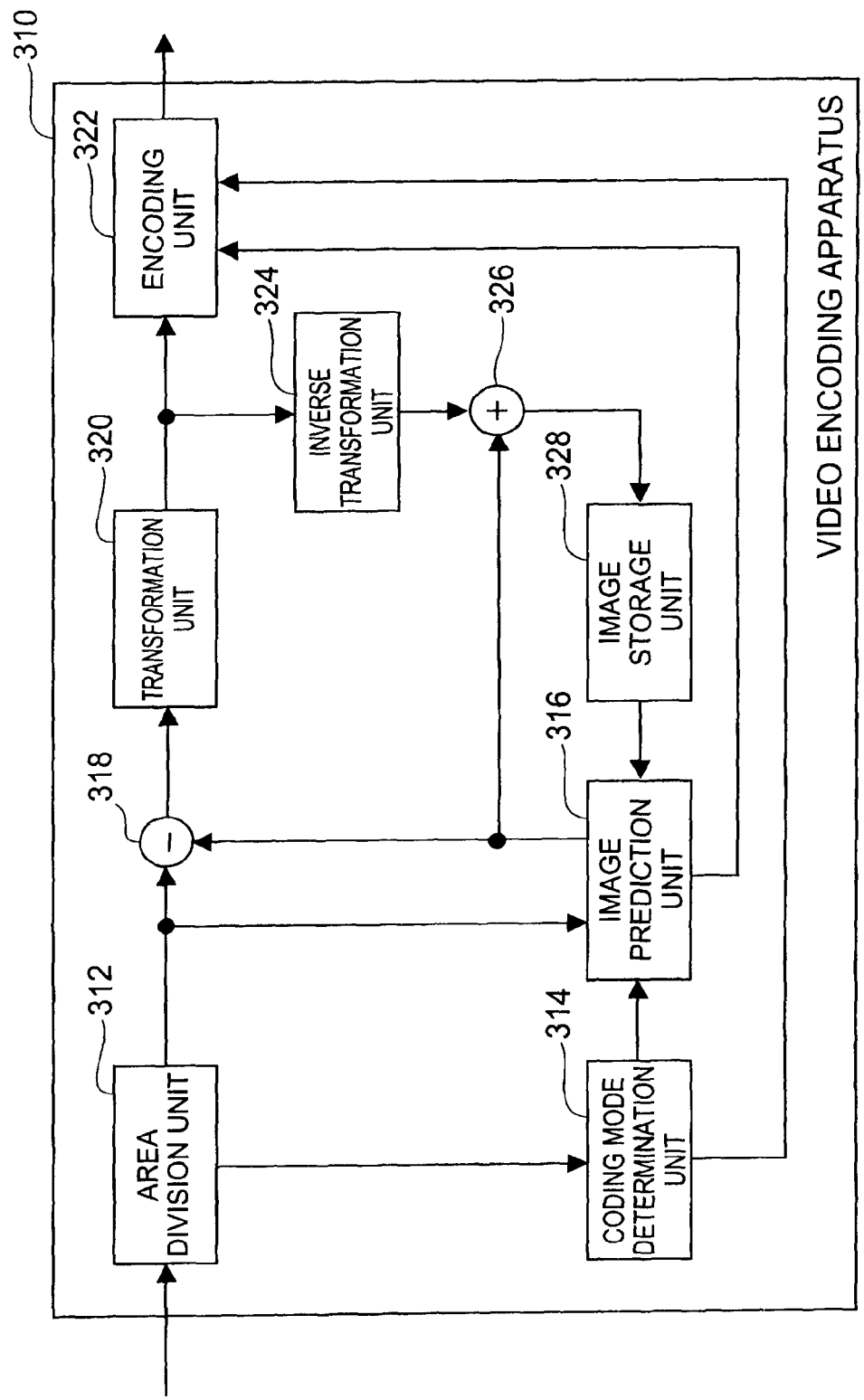
FIG. 16 is a diagram showing the configuration of a video encoding apparatus of the third embodiment.

The third embodiment of the present invention will be described below. FIG. 16 is a diagram showing the configuration of a video encoding apparatus of the third embodiment of the present invention. A video encoding apparatus 310 shown in FIG. 16 can physically be a computer comprising a CPU (central processing unit), a storage device such as a memory, a display devices such as a display, and a communication device. Furthermore, the video encoding apparatus 310 may be a mobile communication terminal such as a cellular phone, a DVD device, and the like. Thus, a wide variety of devices capable of information processing can be used as the image encoding apparatus.

The video encoding apparatus 310 functionally comprises an area division unit 312, a coding mode determination unit (determination means) 314, an image prediction unit 316, a subtraction unit 318, a transformation unit (transformation means) 320, an encoding unit (encoding means) 322, an inverse transformation unit (inverse transformation means) 324, an addition unit (reproduced image generation means) 326, and an image storage unit (storage means) 328.

The area division unit 312 takes each frame of the input video (dynamic image) successively as a coding target frame and divides the coding target frame into a plurality of partial areas of the predetermined size (referred to hereinbelow as macroblocks). The predetermined size, for example, can be 16×16 pixels, but this size is not limiting.

The area division unit 312 also generates the macroblock position information for specifying the macroblocks. For example, integer numbers assigned in the ascending order to each macroblock in the frame in the raster scanning order can be used for the macroblock position information. Further, the coordinates of pixels positioned in the head portions of macroblocks in the raster scanning order can be used for the macroblock position information.

The coding mode determination unit 314 determines the coding mode of each macroblock and outputs the coding mode information for specifying the coding mode to the image prediction unit 316 and encoding unit 322. In the present embodiment, the coding mode information is the information for specifying whether the prediction image of the macroblock has to be generated by the first image prediction processing or second image prediction processing. An embodiment in which the first image prediction processing is the compensation prediction processing will be described below. Further, hereinbelow, the coding mode relating to the case in which macroblock has to be processed by the first image prediction processing is called a P mode, and the coding mode relating to the case in which macroblock has to be processed by the second image prediction processing is called a C mode. The first image prediction processing is not limited to motion compensation prediction processing. In the first image prediction processing, for example, such processing as the well-known intraframe prediction can be used. The first image prediction processing and second image prediction processing are described below in detail.

The image prediction unit 316 generates the prediction image of a macroblock of the processing target by using either the first image prediction processing or the second image prediction processing on the basis of the coding mode information outputted by the coding mode determination unit 314. When the image prediction unit 316 processes macroblocks by first image prediction processing, the motion vector, which is the prediction assist information, is outputted to the encoding unit 322. The image prediction unit 316 will be described in greater detail later.

The subtraction unit 318 generates a prediction residual image by executing the differential computation of the prediction image of the processing target macroblock that was generated by the image prediction unit 316 and the input image of the macroblock of the processing target that is outputted from the area division unit 312.

The transformation unit 320 transforms the prediction residual image, thereby generating the transformation information. For example, inverse quantizing processing and transformation processing such as DCT (Discrete Cosine Transform) can be used for this transformation. In this case, a set of quantizing coefficients is included in the transformation information. A two-dimensional DCT with 4 rows by 4 columns and two-dimensional DCT with 8 rows by 8 columns can be used for the DCT. Further, a 4×4 integer orthogonal transformation and quantizing that have been used in the H.264, a MP method (Matching Pursuit), or any transformation processing-quantizing processing such as vector quantizing and wavelet transformation can be used for the transformation.

The encoding unit 322 executes encoding of the macroblock position information from the area division unit 312, coding mode information from the coding mode determination unit 314, motion vector from the image prediction unit 316, and transformation information from the transformation unit 320 by using encoding processing such as entropy encoding. The encoding results are included in a bit stream and outputted.

The inverse transformation unit 324 generates the restored prediction residual image which is obtained by restoring the prediction residual image by executing the inverse transformation of the transformation information from the transformation unit 320. When the transformation information comprises a set of quantizing coefficients, the inverse transformation unit 324 applies the inverse quantizing processing and inverse transformation processing to the quantizing coefficients, thereby generating the restored prediction residual image, which is obtained by restoring the prediction residual differential image.

The addition unit 326 generates the reproduced image by adding the restored prediction residual image from the inverse transformation unit 324 and the prediction image from the image prediction unit 316, incorporates the reproduced image into the reproduced frame, and stores it in the image storage unit 328. Further, when a range is set for the pixel values of the image data, the addition unit 326 may execute clipping of the pixel values of the addition results so as to fit them into the range.

The image storage unit 328 stores the reproduced frame in which the already-generated reproduced image of the coding target macroblock of the frame is incorporated and also the reference frame. The reference frame is a reproduced frame of the frame different from the coding target frame. In the present embodiment, the reference frame is the first preceding reproduced frame.

The coding mode determination unit 314 will be described below in greater detail. FIG. 17 is an explanatory diagram for the processing of the coding mode determination unit. The rectangle area in FIG. 17 shows a macroblock and the solid lines and dotted lines provided with arrow symbols show the scanning order.

In the coding mode determination unit 314, as shown in (a) of the figure, first, a reproduced frame composed of reproduced images of all the macroblocks of the encoding target frame is generated via the generation of the prediction images of all the macroblocks of the encoding target frame (that is, generation of prediction images in the P mode) based on the first image prediction processing (motion compensation prediction processing) in the predetermined scanning order (for example, raster scanning order).

The coding mode determination unit 314, as shown in (b) of the figure, generates the reproduced images of all the macroblocks of the encoding target frame via the generation of prediction images of all the macroblocks of the encoding target frame based on the second image prediction processing in the scanning order inversed with respect to the aforementioned scanning order.

When generating the prediction images by using the second image prediction processing, the coding mode determination unit 314 uses the reproduced images of the macroblocks positioned in front of the processing target macroblock in the predetermined scanning order, the reproduced images of the macroblocks for which the coding mode is the P mode, among the macroblocks positioned behind in the predetermined scanning order, and the reference frame stored in the image storage unit 328. For example, as shown in (c) of the figure, if a macroblock assigned with symbol "A" is taken as the processing target macroblock, then the second image prediction processing is executed by using the reproduced image of the macroblocks located in front of the macroblock A, among the macroblocks of reproduced frame, a reproduced image of the macroblock for which the coding mode is the P mode and which is located behind the macroblock A (in the figure, this macroblock is assigned with symbol "P"), and the reference frame stored in the image storage unit 328. The second image prediction processing will be described later in greater detail.

Each time the reproduced image is generated via the second image prediction processing, the coding mode determination unit determines the coding mode by executing the cost computation relating to each reproduced image generated via the first image prediction processing and reproduced image generated via the second image prediction processing.

The cost is computed by the formula $D+\lambda \cdot R$, where R is the number of bits required for encoding the processing target macroblock, D is the square sum of the errors of each pixel of the reproduced image of this macroblock and each pixel of the input image of this macroblock, and $\lambda$ is the coefficient that was set in advance. Of the P mode and C mode, the coding mode determination unit 314 selects a mode with a lower cost as the coding mode. The cost may be determined from any function, provided that it can represent the encoding efficiency and/or quality.

Figure 18:
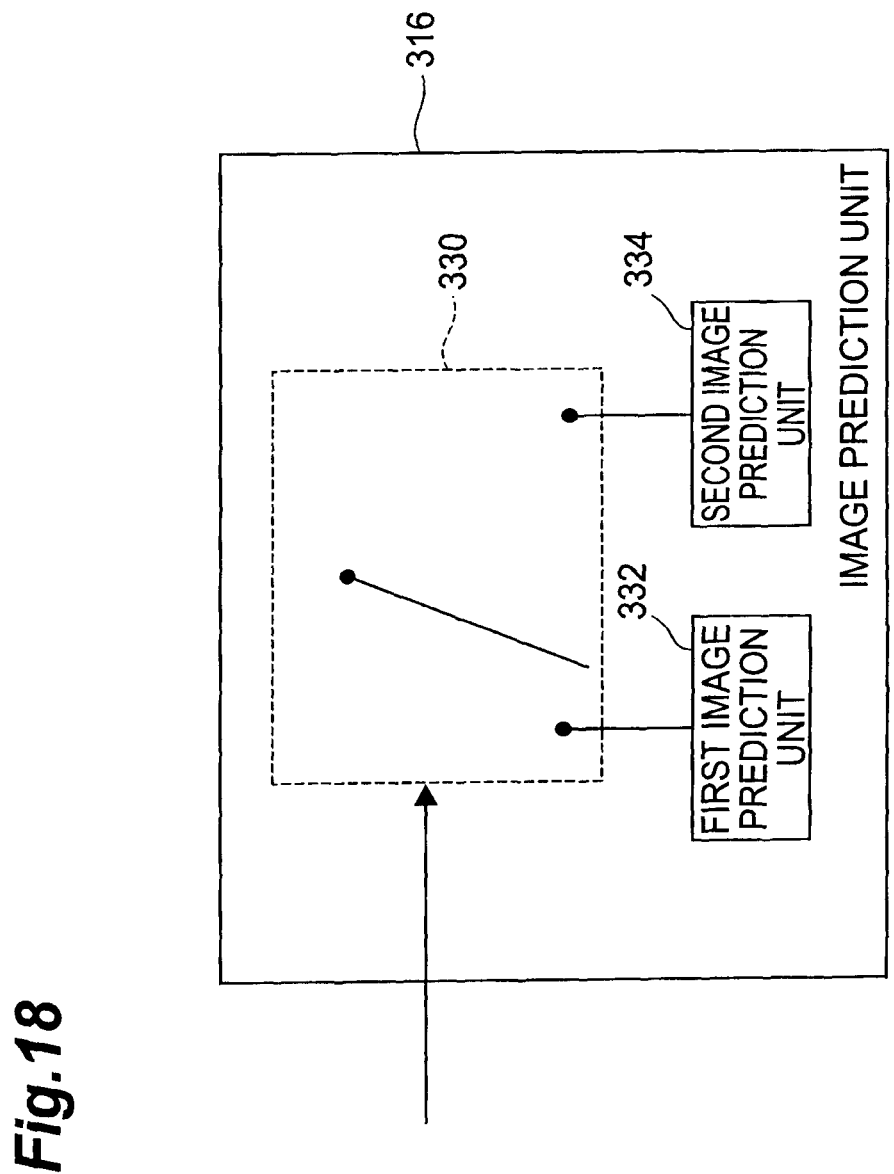
FIG. 18 is a block diagram illustrating the structure of an image prediction unit.

The image prediction unit 316 will be described below in greater detail. FIG. 18 is a block diagram showing the configuration of the image prediction unit 316. The image prediction unit 316 comprises a mode switching unit 330, a first image prediction unit (first image prediction means) 332, and a second image prediction unit (second image prediction means) 334.

The mode switching unit 330 receives the coding mode information from the coding mode determination unit 314 and activates the first image prediction unit 332 or second image prediction unit 334 according to the coding mode specified by the coding mode information. The mode switching unit 330 activates the first image prediction unit 332 when the coding mode is the P mode and activates the second image prediction unit 334 when the coding mode is the C mode.

In the video encoding device 310, the mode switching unit 330 initially makes the first image prediction unit 332 to generate the prediction images of macroblocks for which the coding mode is the P mode, out of all the macroblocks of the encoding target frame. Then, the mode switching unit 330 makes the second image prediction unit 334 to generate the prediction images of the macroblock for which the coding mode is the C mode, among all the macroblocks of the encoding target frame.

The first image prediction unit 332, as described above, generates the reproduced image by the first image prediction processing, that is, by the motion compensation prediction processing. The motion compensation prediction processing is the processing in which block matching of the input image of the processing target macroblock and any area of the reference frame is executed, the partial image of the area of the reference frame with the highest correlation is adopted as the reproduced image, and the motion vector to this area is generated. The correlation, for example, can be determined from the evaluation function D+λR, where D is the differential square sum of the input image of the processing target macroblock and the reproduced image of the area of the matching target, R is the data length required for encoding the motion vector from the processing target macroblock to the area, and λ is the coefficient that was set in advance. The motion compensation prediction processing may be executed by using the reference frame that was two-fold or four-fold up-sampled. Furthermore, the motion compensation prediction processing may be also executed with small blocks obtained by further dividing the macroblock. In this case, the motion vectors for each small block and a macroblock division mode representing the type of macroblock division is outputted.

Figure 19:
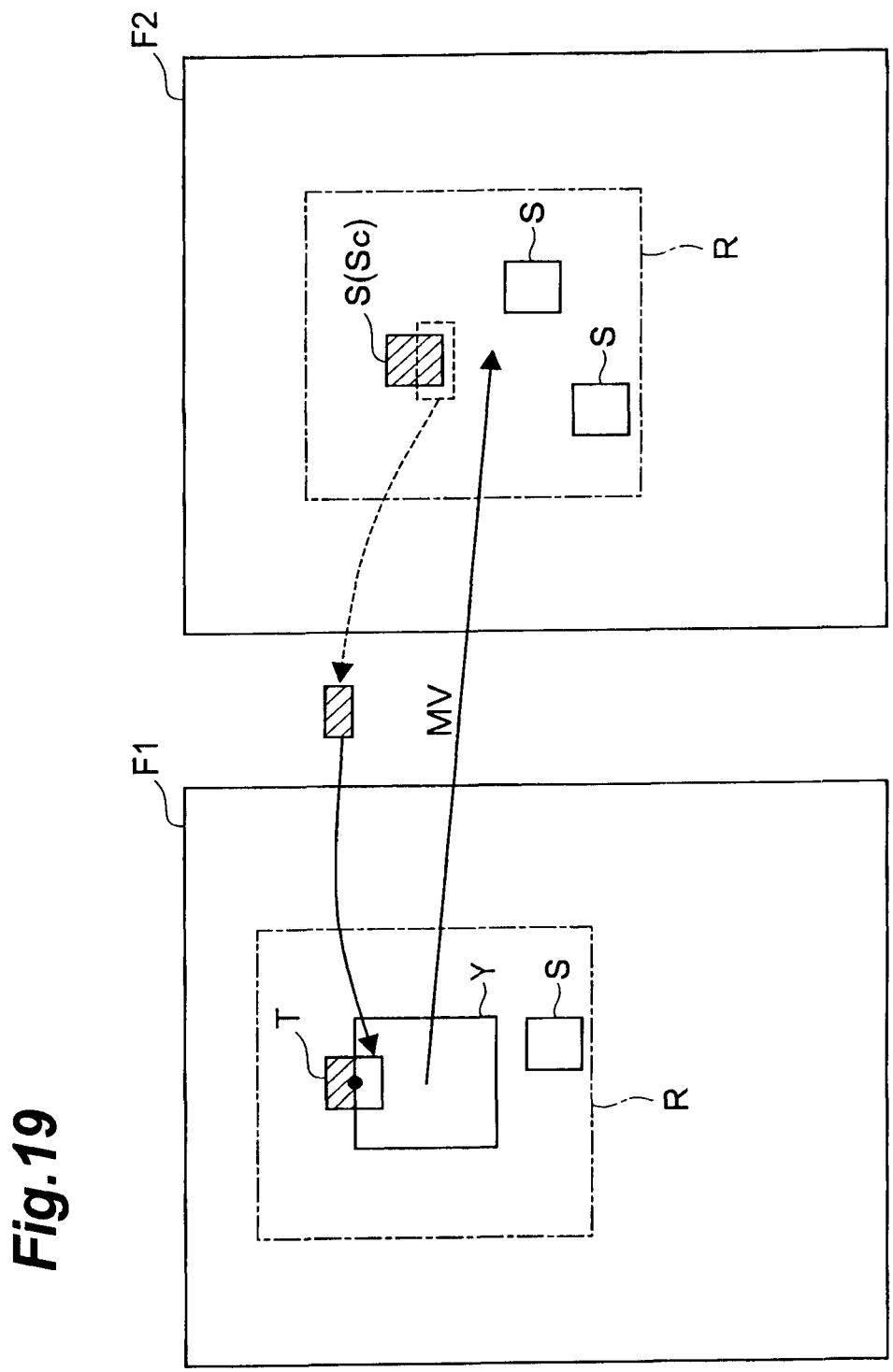
FIG. 19 is an explanatory diagram for the second image prediction processing.

The second image prediction unit 334 generates, by using the second image prediction processing, the prediction image of the macroblock for which the coding mode was determined to be the C mode. FIG. 19 is an explanatory diagram showing the second image prediction processing. In the second image prediction processing, the macroblock Y for which the reproduced image was not generated is selected. Within this macroblock Y, the unprocessed pixel to which the pixel value of the reproduced image (i.e. prediction signal) has not been given is selected and a template T including the pixel is set. In the present embodiment, a template T with the aforementioned unprocessed pixel as a center is set, but the template T can have any size and shape if both the processed pixel and the unprocessed pixel are included. Furthermore, with respect to the macroblock Y, a reference area R of a random size is set for the reproduced frame F1. The reference area R is also set for the reference frame F2 that was stored in the storage unit 328. The reference area R in the reference frame F2 may be provided in the position of the reference frame F2 corresponding to the position of the reference area R provided in the reproduced frame F1. Alternatively, the reference area R in the reference frame F2 may be provided in the shifted position corresponding to the motion vector composed of the median value of the motion vectors of the macroblocks surrounding the macroblock Y.

In the second image prediction processing, the correlation between the candidate area S with the generated reproduced image present in any position in the reference area R and template T is calculated and the candidate area with the highest correlation is selected as the duplicative reference area Sc. This correlation is calculated, for example, by determining available pixels satisfying the condition where both of the pixel in the template T and the corresponding pixel in the candidate area S have a pixel value of the reproduced image, and then dividing the square sum of the differential value between the pixel values of the available pixels of the candidate area S and template T, that is, the matching error M, by the number U of available pixels. This correlation can be determined by any computational method, provided that the similarity of the images of the template T and candidate area S can be represented.

In the second image prediction processing, the pixel values of the corresponding pixels of the duplicative reference area Sc are copied as compensation pixel values into the unprocessed pixels for which the pixel values of the reproduced images have not been given in the template T. In FIG. 19, the portion for which the reproduced images have not been generated in template T is hatched. FIG. 19 depicts an operation in which the pixel values of the lower part of the duplicative reference area Sc are given to area (lower part in the template T) for which the reproduced image has not been generated in the template T. In the second image prediction processing, the selection of pixel is repeated and the reproduced images are generated till all the unprocessed pixels to which the pixel values of the reproduced image have not been given are eliminated.

Figure 20:
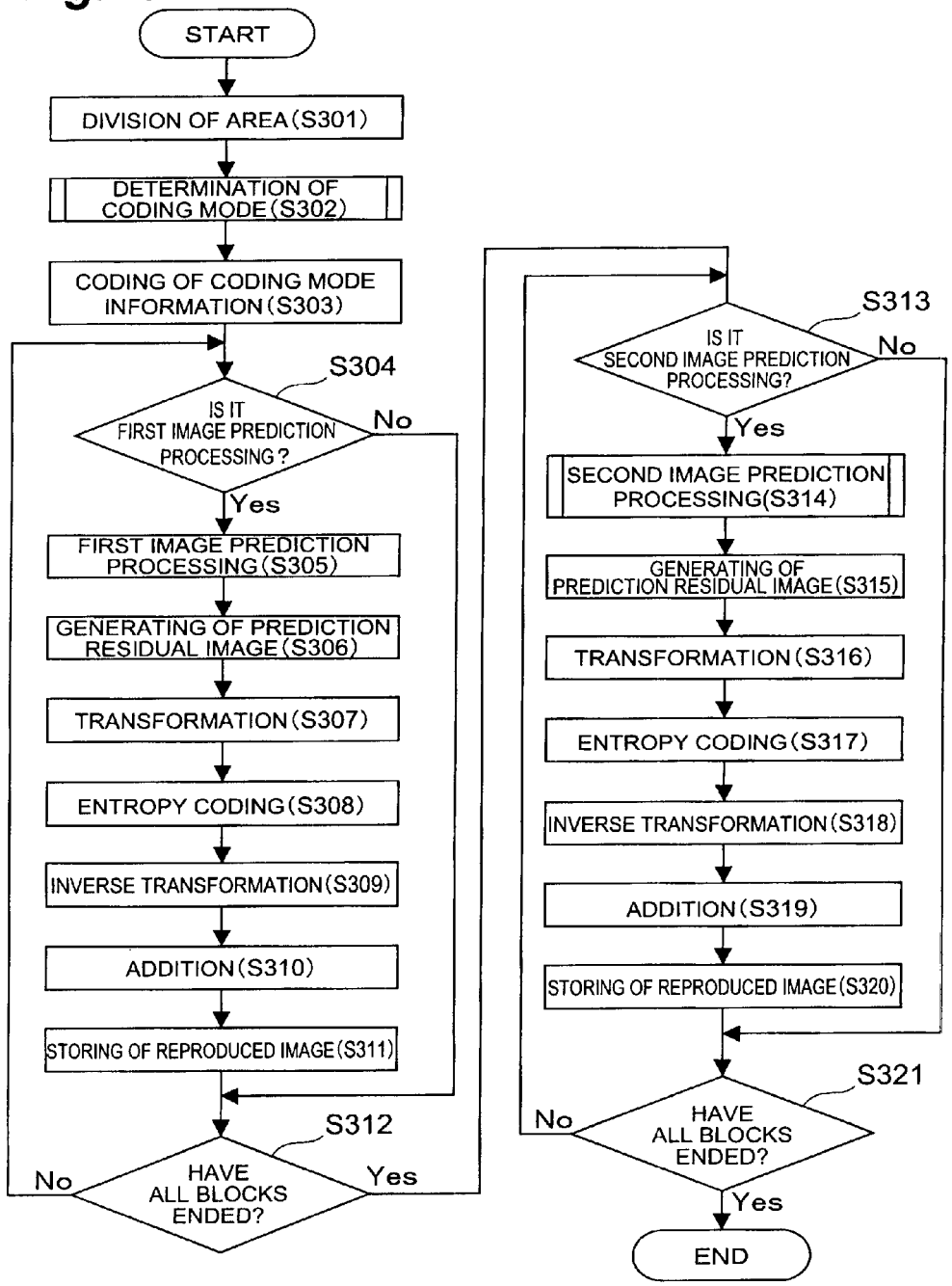
FIG. 20 is a flowchart of a video encoding method according to the third embodiment.

The operation of the video encoding apparatus 310 will be explained below. At the same time, the video encoding method of an embodiment of the present invention will be explained. FIG. 20 is a flow chart illustrating the video image encoding method of the third embodiment.

As shown in FIG. 20, in the encoding process in the video encoding apparatus 310, the coding target frame is divided into a plurality of macroblocks by the area division unit 312 (step S301). Further, the aforementioned macroblock position information is generated by the area division unit 312.

Figure 21:
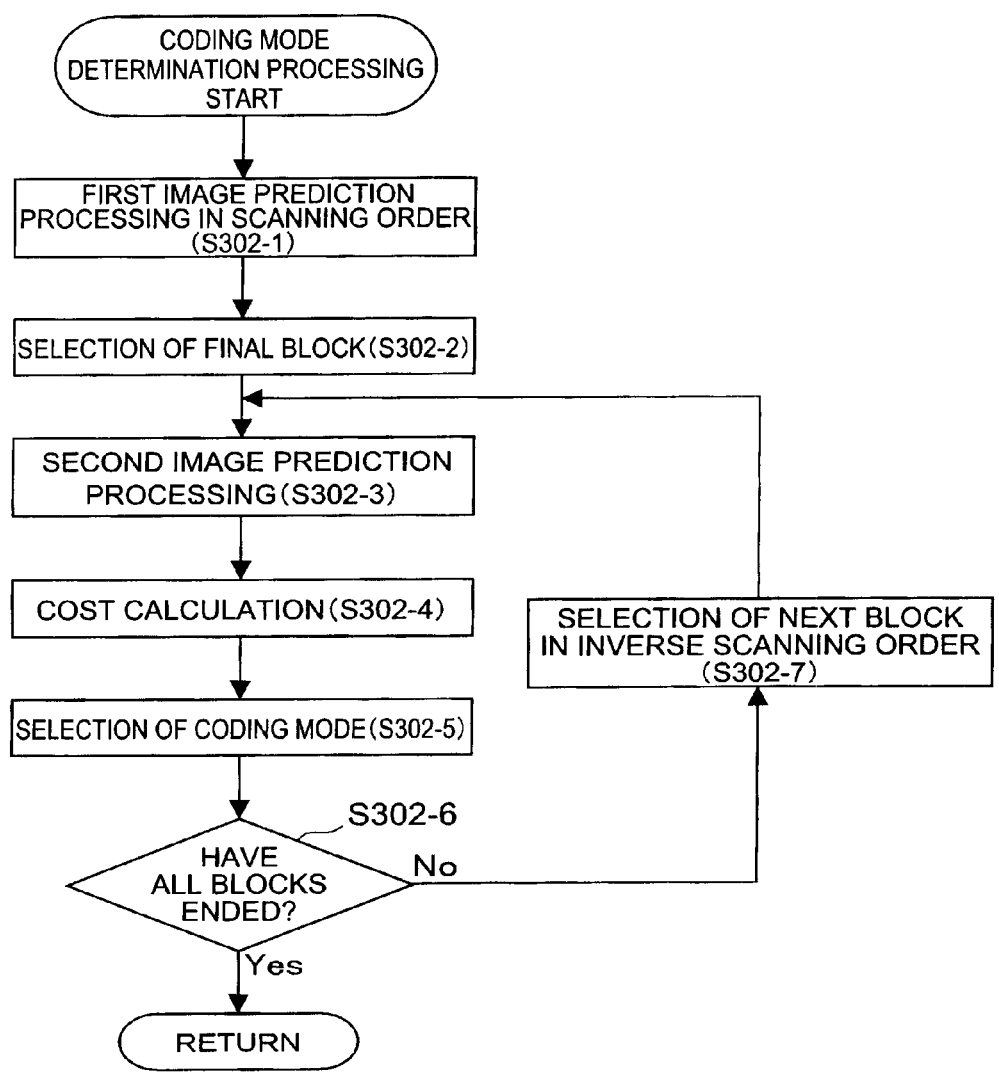
FIG. 21 is a flowchart of coding mode determination processing in the video encoding method according to the third embodiment.

Then, the coding mode determination processing for determining the coding mode of each macroblock is executed by the coding mode determination unit 314 (step S302). FIG. 21 is a flow chart of the coding mode determination processing in the video encoding method of the third embodiment. As shown in FIG. 21, in the coding mode determination processing, first, the reproduced frame composed of reproduced images of all the blocks is generated via the first image prediction processing (motion compensation prediction processing) in the scanning order (raster scanning order) (step S302-1).

Then, the final macroblock in the scanning order is selected as the processing target macroblock (step S302-2) and the above-described second image prediction processing is executed (step S302-3). In the second image prediction processing, as described above, the reproduced image of the processing target macroblock is generated by using the reproduced image of the macroblock positioned in front of the processing target macroblock in the scanning order, the reproduced image of the macroblock for which the coding mode is the P mode and which is located behind the processing target in the scanning order in the reproduced frame generated via the step S302-1, and the reference frame.

Then, the costs of the reproduced images generated in the step S302-3 and reproduced images of generated in the step S302-1 for the processing target macroblock are calculated by using the above-described cost function (step S302-4). Then, a mode having a lower cost out of the first image prediction processing, that is, the P mode, and second image prediction processing, that is, the C mode, is selected as the coding mode (step S302-5).

Then, a test is executed as to whether all the macroblocks have been processed (step S302-6). When processing of all the macroblocks has been completed (Yes), the determination processing of the coding mode is ended. On the other hand, if the processing of all the macroblocks has not been completed (No), a macroblock for which the coding mode has not been determined in the inverse scanning order is selected (step S302-7), and the processing from the step S302-3 to the step S302-6 is repeated.

Returning to FIG. 20, then the coding mode information is encoded with the encoding unit 322 in the video encoding apparatus 310 (step S303). Then, a macroblock is selected as a processing target in the predetermined scanning order (for example, raster scanning order) with the mode switching unit 330, and a test is executed as to whether or not the coding mode of the processing target macroblock is the P mode (first image prediction processing) (step S304). When the coding mode is not the P mode (No), the processing shift to step S312. On the other hand, when the coding mode is the P mode (Yes), the mode switching unit 330 activates the first image prediction unit 332 and the prediction image of the processing target macroblock is generated by the first image prediction processing (step S305).

Then, the subtraction unit 318 subtracts the prediction image from the input image of the processing target macroblock, thereby generating the prediction residual image (step S306). Then, this prediction residual image is transformed into transformation information by the transformation unit 320 (step S307). Then, the motion vector and transformation information is subjected to entropy encoding with the encoding unit 322 (step S308).

Then, the transformation information is subjected to inverse transformation with the inverse transformation unit 324 and the restored prediction residual image obtained by restoring the prediction residual differential image is generated (step S309). The reproduced image of the processing target macroblock is then generated by adding the restored prediction residual image and the prediction image from the image prediction unit 316 with the addition unit 326 and the reproduced image of the processing target macroblock is generated (step S310). The reproduced image is incorporated in the reproduced frame and stored in the image storage unit 328 (step S311).

Then, a test is executed as to whether all the macroblocks have been processed (step S312). When the processing of all the macroblocks has not been completed (No), the unprocessed macroblock is selected and processing from step S304 to step S312 is repeated. On the other hand, when the processing of all the macroblocks has been completed (Yes), the processing shifts to step S313.

In step S313, macroblocks are selected as processing targets in the predetermined scanning order (for example, raster scanning order) and a test is executed as to whether or not the coding mode of the processing target macroblock is the C mode (second image prediction processing). When the coding mode is not the C mode (No), the processing shifts to step S321.

Figure 22:
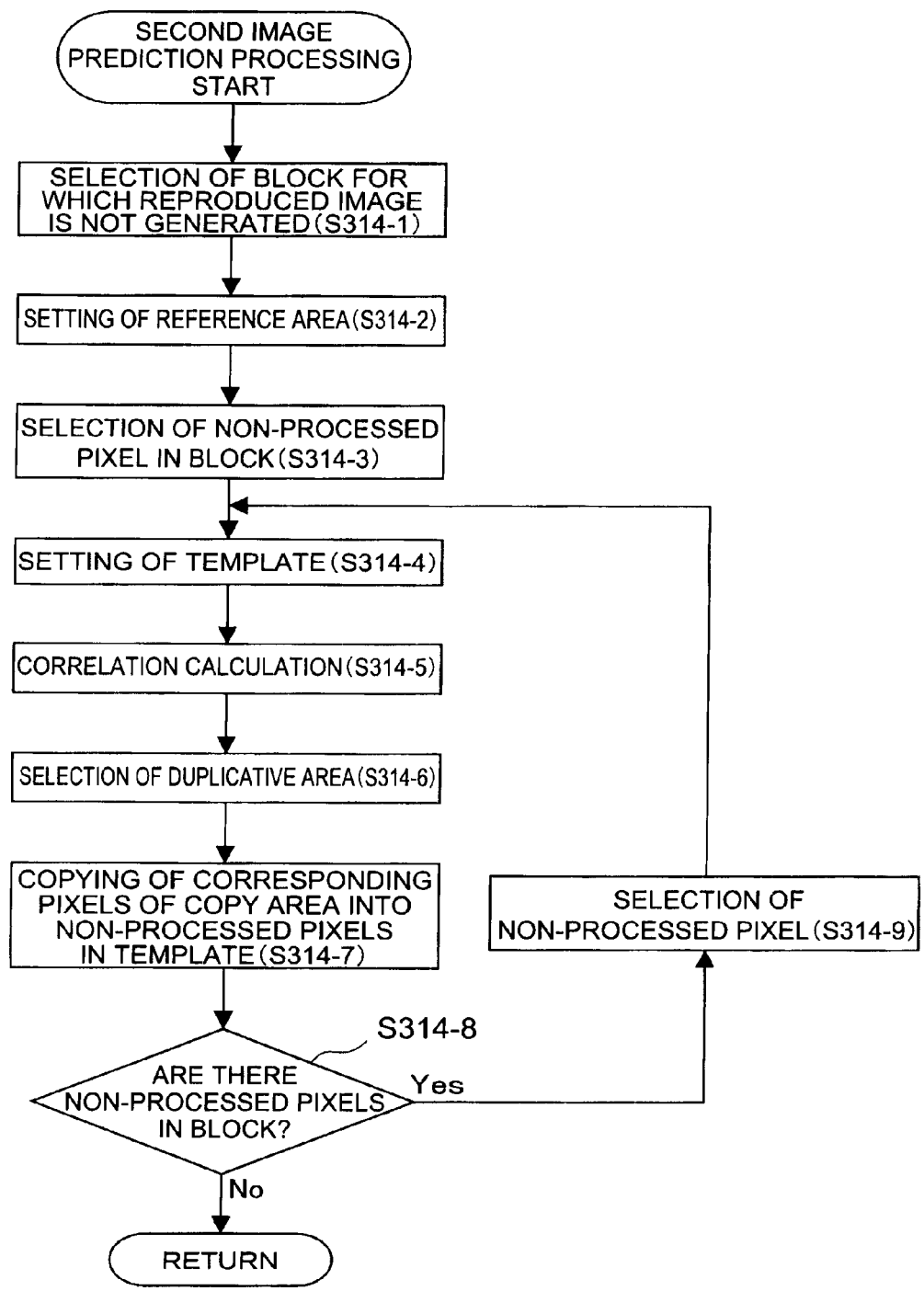
FIG. 22 is a flowchart of second image prediction processing.

On the other hand, when the coding mode is the C mode (Yes), the mode switching unit 330 activates the second image prediction unit 334 and the prediction image of the processing target macroblock is generated by the second image prediction processing (step S314). FIG. 22 is a flowchart of the second image prediction processing in the video coding method in the third embodiment.

As shown in FIG. 22, in the second image prediction processing, the block for which the reproduced image has not been generated is selected. In the present embodiment, the macroblock for which the coding mode is the C mode is selected as the processing target macroblock in the predetermined scanning order (step S314-1).

Then, the reference area relating to the processing target macroblock is set as described hereinabove (step S314-2). Pixel is then selected from which the reproduced image in the macroblock has not been generated (step S314-3) and a template including the pixel is set (step S314-4).

The correlation of this template and the candidate area in the reference area is computed in the above-described manner (step S314-5) and the candidate area with the highest correlation is selected as the duplicative reference area (step S314-6).

Then, pixel values of the corresponding pixels of the duplicative reference area are copied into the unprocessed pixels in the template for which the pixel values of the reproduced images have not been given (step S314-7). Then, a test is executed as to whether or not the unprocessed pixels for which the pixel values of the reproduced image have not been given are present in the processing target macroblock (step S314-8). When the unprocessed pixel is present (Yes), the unprocessed pixel is selected (step S314-9) and the processing of steps S314-4 to S314-8 is repeated. On the other hand, when no unprocessed pixels are present in the processing target macroblock, the second image prediction processing (step S314) is ended.

Returning to FIG. 20, in the video encoding apparatus 310, a prediction residual image is generated by the subtraction unit 318, this prediction residual image being composed of the difference between the input image of the processing target macroblock and the prediction image generated by the second image prediction processing (step S315).

Then, the prediction residual image is transformed into the transformation information with the transformation unit 320 (step S316). The transformation information is then subjected to entropy encoding with the encoding unit 322 (step S317).

The transformation information is then inversely transformed by the inverse transformation unit 324 and thus a restored prediction residual image obtained by restoring the prediction residual image is generated (step S318). The restored prediction residual image and the prediction image from the image prediction unit 316 are then added with the addition unit 326 and a reproduced image of the processing target macroblock is generated (step S319). This reproduced image is incorporated in the reproduced frame and stored in the image storage unit 328 (step S320).

Then, a test is conducted as to whether or not all the macroblocks have been processed (step S321). When the processing of all the macroblocks has not been completed (No), the unprocessed macroblock is selected and the processing from step S313 to step S321 is repeated. On the other hand, when the processing of all the macroblocks has been completed (Yes), the encoding process is ended.

Figure 23:
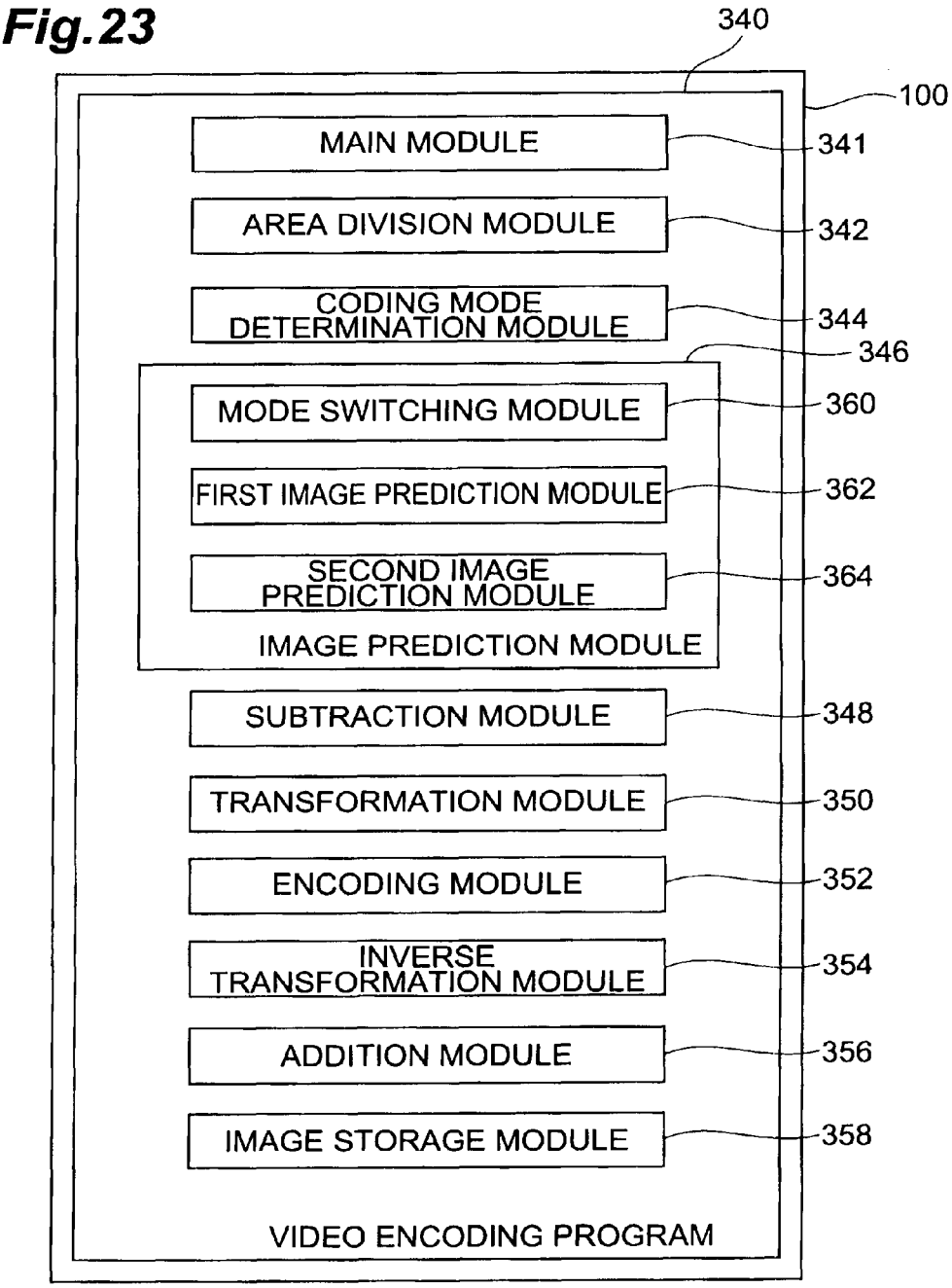
FIG. 23 is a diagram showing both the structure of a video encoding program of the third embodiment and a recording medium.

A video encoding program for causing a computer to operate as the video encoding apparatus 310 will be described hereinbelow. FIG. 23 is a diagram showing the configuration of the video encoding program relating to the third embodiment together with the recording medium. The video encoding program 340 shown in FIG. 23 is provided in the form in which it is stored in the recording medium 100. Examples of the recording medium 100 include a semiconductor memory or a recording medium such as floppy disks, CD-ROM, DVD, or ROM.

If the recording medium 100 is inserted into the read device 112, the computer 110 (see FIG. 14 and FIG. 15) can access the video encoding program 340 stored in the recording medium 100 from the read device 112 and can function as the video encoding apparatus 310, following the video encoding program 340.

As shown in FIG. 15, the video encoding program 340 may be also provided via a network as a computer data signal 130 superimposed on the carrier wave. In this case, the computer 110 stores the video encoding program 340 received by the communication device 124 in the memory 116 and executes this video encoding program 340.

As shown in FIG. 23, the video encoding program 340 comprises a main module 341 for controlling the processing, an area division module 342, a coding mode determination module 344, an image prediction module 346, a subtraction module 348, a transformation module 350, an encoding module 352, an inverse transformation module 354, an addition module 356, and an image storage module 358. The image prediction module 346 comprises a mode switching module 360, a first image prediction module 362, and a second image prediction module 364.

The functions of the area division module 342, coding mode determination module 344, image prediction module 346, subtraction module 348, transformation module 350, encoding module 352, inverse transformation module 354, addition module 356, image storage module 358, mode switching module 360, first image prediction module 362, and second image prediction module 364 which are executed by the computer are identical to corresponding portions of the above-described area division unit 312, coding mode determination unit 314, image prediction unit 316, subtraction unit 318, transformation unit 320, encoding module 322, inverse transformation unit 324, addition unit 326, unit storage unit 328, mode switching module 330, first image prediction unit 332, and second image prediction unit 334.

The operation and effect of the video encoding apparatus 310 will be explained hereinbelow. With the video encoding apparatus 310 of the third embodiment, because it is not necessary to include data based on the prediction assist information into the data stream, a bit stream with a high coding efficiency can be generated with respect to macroblocks for which the coding mode is the C mode, that is, the macroblocks for which the prediction image is generated by the second image prediction processing.

In the video encoding apparatus 310, the second image prediction unit 334 generates the prediction image by using the reference frame and the reproduced frame of the coding target frame. This reproduced frame includes the reproduced image that has already been generated via the first image prediction processing and second image prediction processing. Thus, the second image prediction unit 334 generates the prediction image by using the reference frame composed of the reproduced image of the frame that is different from the encoding target frame and the reproduced frame composed of the reproduced image of the coding target frame. Therefore, the encoded data are generated in which the redundancy in the time direction and space direction is reduced.

Further, in the second image prediction processing, the reproduced frame comprising the reproduced images generated via the first image prediction processing and second image prediction processing is used. Therefore, the reproduced image position behind in the scanning order also can be used for prediction. As a result, the redundancy in the spatial direction can be effectively reduced.

Fourth Embodiment

The video decoding apparatus of the fourth embodiment of the present invention will be explained below.

Figure 24:
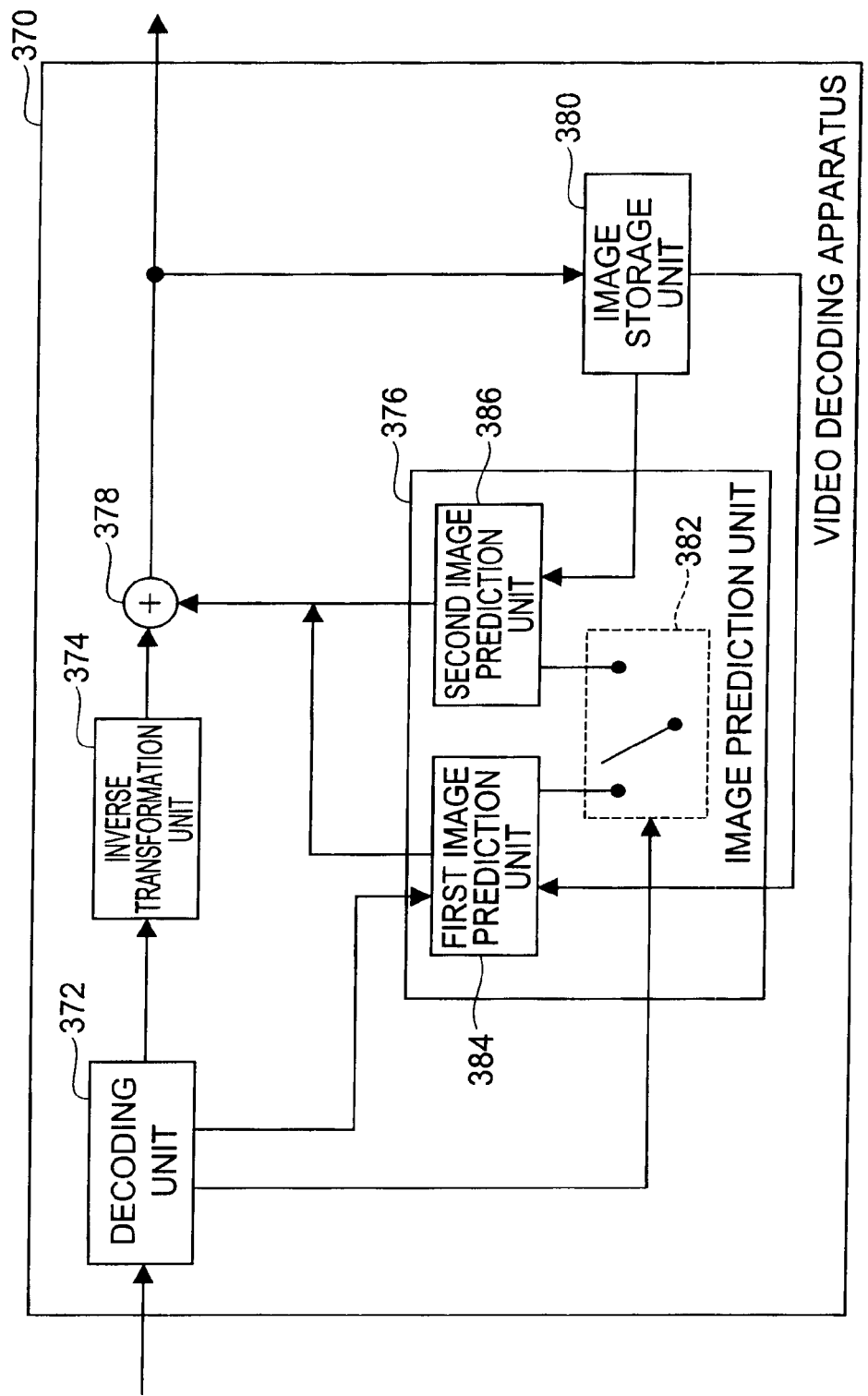
FIG. 24 is a diagram showing the structure of a video decoding apparatus of the fourth embodiment.

FIG. 24 shows the configuration of the video decoding apparatus of the fourth embodiment. A video decoding apparatus 370 shown in FIG. 24 physically can be a computer comprising, for example, a CPU (central processing unit), a storage device such as a memory, a display device such as a display, and a communication unit. Further, the video decoding apparatus 370 may be a mobile communication terminal such as a cellular phone, a DVD device, and the like. Thus, a wide variety of devices capable of information processing can be used as the image encoding apparatus.

As shown in FIG. 24, the video decoding apparatus 370 comprises a decoding unit (decoding means) 372, an inverse transformation unit (inverse transformation means) 374, an image prediction unit 376, an addition unit (reproduced image generation means) 378, and an image storage unit (storage means) 380.

The decoding unit 372 receives the inputted bit stream and decodes the bit stream. When a bit stream generated by the video encoding apparatus 310 is received, the decoding unit 372 decodes the bit stream thereby generating the macroblock position information, coding mode information, motion vector, and transformation information.

The inverse transformation unit 374 receives the transformation information from the decoding unit 372 and generates the restored prediction residual image of the processing target macroblock by executing the inverse transformation of the transformation information of the processing target macroblock. The inverse transformation unit 374 outputs the restored prediction residual image to the addition unit 378. The processing with the inverse transformation unit 374 is the processing identical to that of the inverse transformation unit of the video encoding apparatus 310.

The image prediction unit 376 generates the prediction image of the processing target macroblock and outputs the prediction image to the addition unit 378. The prediction unit 376 comprises a mode switching unit 382, a first image prediction unit (first image prediction means) 384, and a second image prediction unit (second image prediction means) 386. The mode switching unit 382 activates the first image prediction unit 384 or second image prediction unit 386 based on the coding mode information from the decoding unit 372. The first image prediction unit 384 generates the prediction image of the processing target macroblock by the first image prediction processing, and the second image prediction unit 386 generates the prediction image of the processing target macroblock by the second image prediction processing. The processing with those elements comprised in the image prediction unit 376 is identical to the processing conducted with the corresponding elements in the image prediction unit 316 of the video encoding apparatus 310.

The addition unit 378 adds the prediction image from the image prediction unit 376 to the restored prediction residual image from the inverse transformation unit 374, thereby generating the reproduced image of the processing target macroblock, and storing it in the image storage unit 380. Further, when a range is set for pixel values of the image data, the addition unit 378 may conduct clipping of the pixel values obtained by the addition so as to fit them into this range.

The image storage unit 380 stores the reference frame and the reproduced frame of the decoding target frame incorporating the generated reproduced image. The reference frame, as described hereinabove, is a reproduced frame of the frame that is different from the decoding target frame. In the present embodiment, the reference frame is the first preceding reproduced frame of the decoding target frame.

Figure 25:
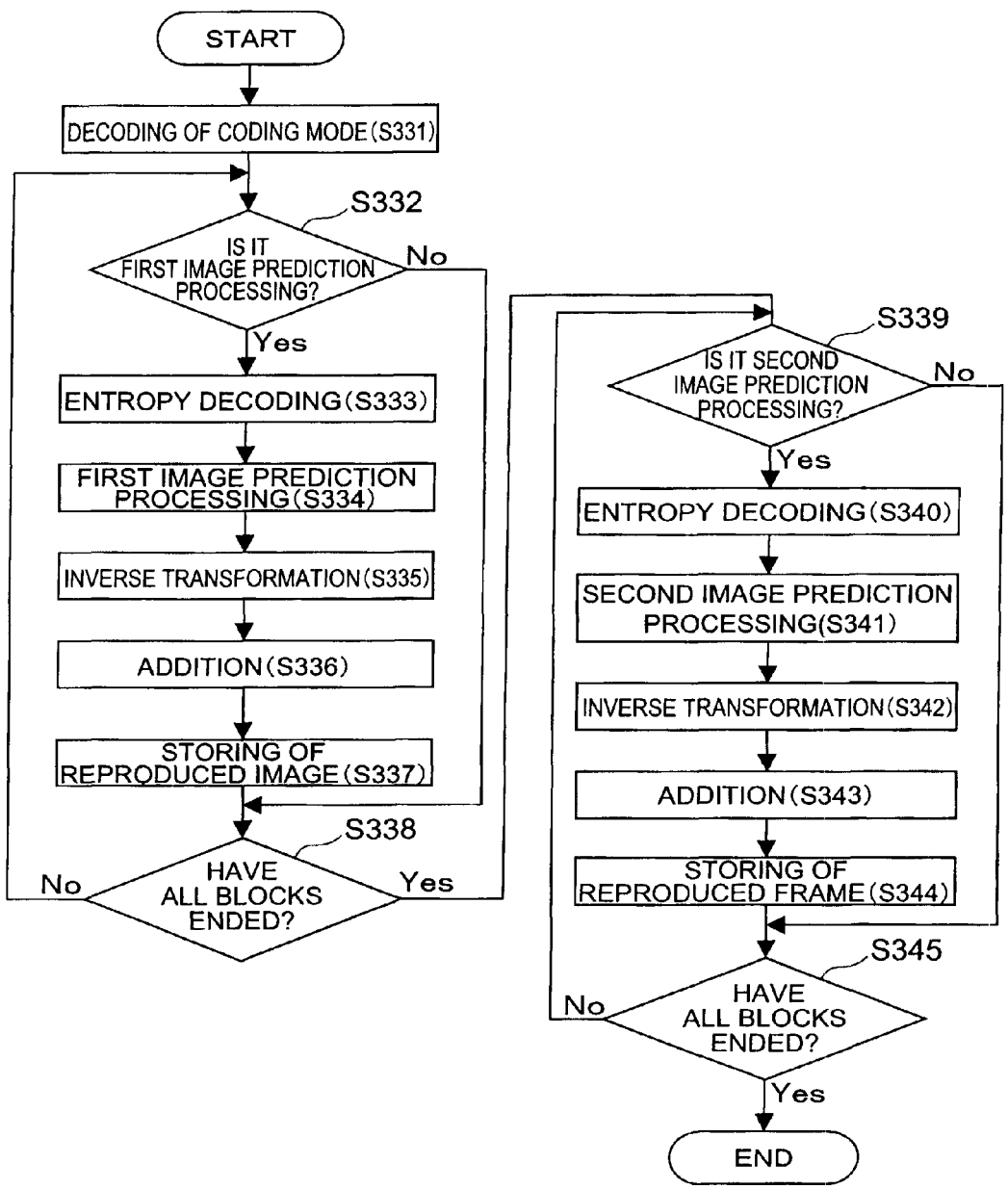
FIG. 25 is a flowchart of a video decoding method according to the fourth embodiment.

The operation of the video decoding apparatus 370 will be described below. At the same time the video decoding method of an embodiment of the present invention will be also explained. FIG. 25 is a flowchart of the video decoding method of the fourth embodiment.

As shown in FIG. 25, in the decoding process in the video decoding apparatus 370, first, the coding mode information of all the macroblocks of the decoding target frame is decoded from the bit stream (step S331).

Then, the macroblocks are selected as processing targets in the predetermined scanning order (for example, raster scanning order) by the mode switching unit 382, and a test is conducted as to whether or not the coding mode of the processing target macroblock is the P mode (first image prediction processing) (step S332). When the coding mode is not the P mode (No), the process shifts to step S338. On the other hand, when the coding mode is the P mode (Yes), the decoding unit 372 executes entropy decoding of the transformation information of the macroblock that is the processing target and the motion vector from the bit stream (step S333). Then, the mode switching unit 382 activates the first image prediction unit 384, thereby generating the prediction image of the processing target macroblock by the first image prediction processing (step S34).

The inverse transformation of the transformation information is then executed by the inverse transformation unit 374, thereby generating the reproduced prediction residual image (step S335). This restored prediction residual image and the prediction image are then added with the addition unit 378, thereby generating a reproduced image (step S336). This reproduced image is incorporated in the reproduced frame and stored in the image storage unit 380 (step S337).

A test is then conducted as to whether all the macroblocks have been processed (step S338). When processing of all the macroblocks has not been completed (No), the unprocessed macroblock is selected and the processing of step S332 to step 338 is repeated.

On the other hand, when the processing of all the macroblocks has been completed (Yes), the process moves to step S339. In step S339, macroblocks are selected as processing targets in the predetermined scanning order (for example, raster scanning order) by the mode switching unit 82 and a test is executed as to whether or not the coding mode of the processing target macroblock is the C mode (second image prediction processing) (step S339). When the coding mode is not the C mode (No), the process shifts to step S345. On the other hand, when the coding mode is the C mode (Yes), the decoding unit 372 executes the entropy decoding of the transformation information of the processing target macroblock from the bit stream (step S340). Then, the mode switching unit 382 activates the second image prediction unit 386, thereby generating the prediction image of the processing target macroblock by the second image prediction processing (step S341).

The inverse transformation of the transformation information is then executed by the inverse transformation unit 374, thereby generating a reproduced prediction residual image (step S342). This restored prediction residual image and the prediction image are then added with the addition unit 378, thereby generating a reproduced image (step S343). This reproduced image is incorporated in the reproduced frame and stored in the image storage unit 380 (step S344).

A test is then conducted as to whether all the macroblocks have been processed (step S345). When processing of all the macroblocks has not been completed (No), the unprocessed macroblock is selected and the processing of step S339 to step 345 is repeated. On the other hand, when the processing of all the macroblocks has been completed (Yes), the decoding process is ended.

Figure 26:
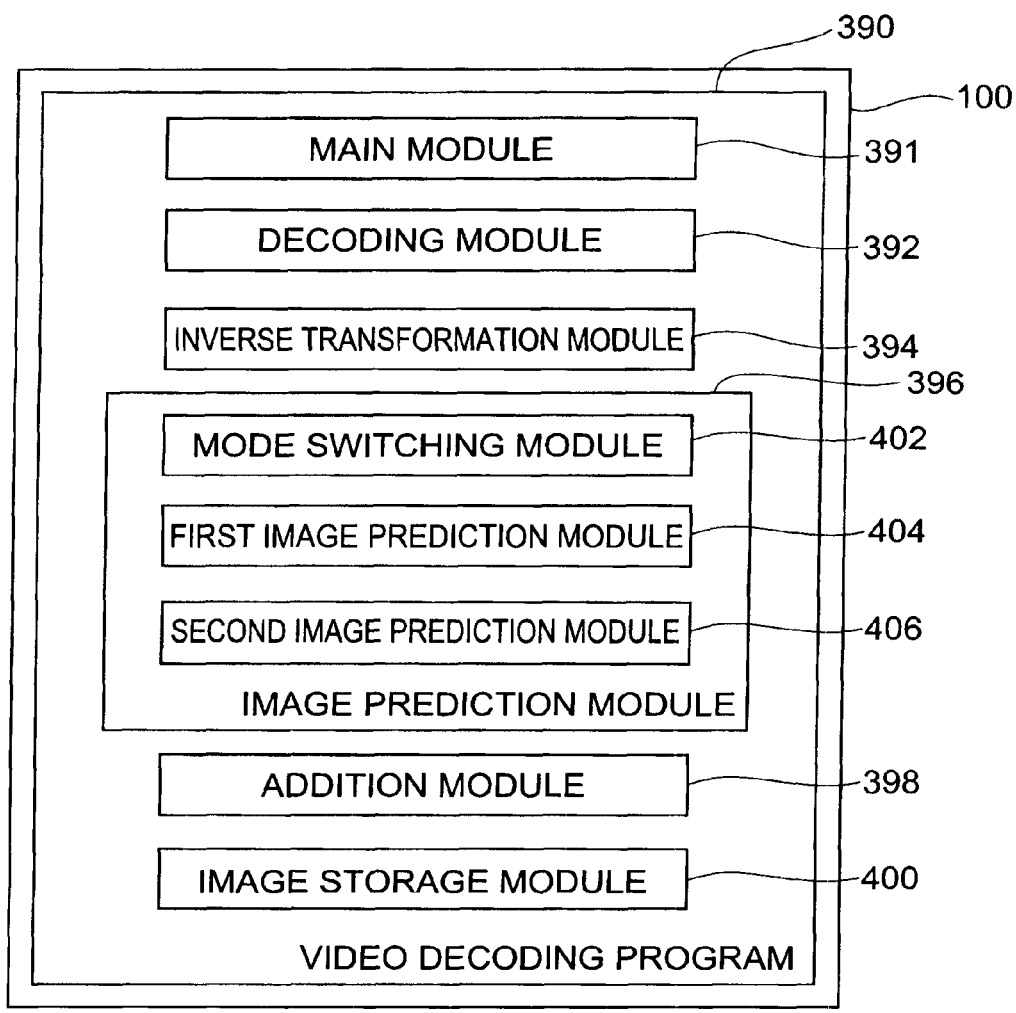
FIG. 26 is a diagram showing both the structure of a video decoding program of the fourth embodiment and a recording medium.

A video decoding program for causing a computer to operate as the video decoding apparatus 370 will be described hereinbelow. FIG. 26 shows the configuration of the video decoding program relating to the fourth embodiment together with the recording medium. The video decoding program 390 shown in FIG. 26 is provided in the form in which it is stored in the recording medium 100. Examples of recording medium 100 include a semiconductor memory or a recording medium such as floppy disks, CD-ROM, DVD, or ROM.

If the recording medium 100 is inserted into the read device 112, the computer 110 (see FIG. 14 and FIG. 15) can access the video decoding program 390 stored in the recording medium 100 from the read device 112 and can function as the video decoding apparatus 370, following the video decoding program 390.

As shown in FIG. 15, the video decoding program 390 may be also provided via a network as a computer data signal 130 superimposed on the carrier wave. In this case, the computer 110 stores the video decoding program 390 received by the communication device 124 in the memory 116 and executes this video decoding program 390.

As shown in FIG. 26, the video decoding program 390 comprises a main module 391 for controlling the processing, a decoding module 392, an inverse transformation module 394, an image prediction module 396, an addition module 398, and an image storage module 400. The image prediction module 396 comprises a mode switching module 402, a first image prediction module 404, and a second image prediction module 406.

The functions of the decoding module 392, inverse transformation module 394, image prediction module 396, addition module 398, image storage module 400, mode switching module 402, first image prediction module 404, and second image prediction module 406 which are executed by the computer are identical to the functions of the corresponding elements of the above-described decoding unit 372, inverse transformation unit 374, image prediction unit 376, addition unit 378, image prediction unit 380, mode switching unit 382, first image prediction unit 384, and second image prediction unit 386.

As described hereinabove, the video decoding apparatus 370 can restore the video based on the bit stream generated by the video encoding apparatus 310. Furthermore, the video decoding apparatus 370 can generate the prediction images, without acquiring the prediction assist information such as a motion vector from the encoding side, with respect to the macroblocks for which the coding mode is the C mode, that is, macroblocks for which the prediction image is generated by the second image prediction processing.

The present invention is not limited to the above-described third and fourth embodiments and various modifications thereof can be made. For example in the third embodiment, in the second image prediction processing, the reference has been made to the reproduced frame composed of the reproduced images of the coding target frame. However, the second image prediction processing can be also executed by referring to the coding target frame, that is, the input image itself, instead of the reproduced frame.

Further, the prediction image generated by the second image prediction processing may be employed "as is" as the reproduced image. In this case, the encoding data relating to the prediction residual image composed of the difference between the prediction image generated by the second image prediction processing and the input image is not required to be included in the bit stream. Therefore, a bit stream with even higher encoding efficiency can be generated.

Further, when the position of a portion with large motion and the position of the background portion with small motion are already known as video characteristics, then the coding mode determination processing can be omitted by referring to a table in which the coding mode of each macroblock was set in advance.

As described hereinabove, the present invention provides an image encoding apparatus, an image encoding method, an image encoding program capable of encoding images with a high efficiency, and an image decoding apparatus, an image decoding method, and an image decoding program capable of restoring the images from the bit stream generated by the image encoding apparatus in accordance with the present invention.

The invention claimed is:

1. An image decoding apparatus comprising: decoding means for decoding coding mode information and prediction assist information from a bit stream which includes data obtained by encoding the coding mode information for specifying between a first image prediction processing and second image prediction processing used for generating a prediction image with respect to each of a plurality of partial areas of predetermined size obtained by dividing an image of a decoding target and the prediction assist information for generating the prediction image by the first image prediction processing; first image prediction means for generating the prediction image of a partial area, out of the plurality of partial areas, that is specified as an area for which the prediction image has to be generated by the first image prediction processing on the basis of the coding mode information, by the first image prediction processing using the prediction assist information from an already-generated reproduced image; second image prediction means for generating by the second image prediction processing the prediction image of a partial area, out of the plurality of partial areas, that is specified as an area for which the prediction image has to be generated by the second image prediction processing on the basis of the coding mode information; and storage means for storing a reproduced image that is based on the prediction image, wherein, in the second image prediction processing, the prediction image is generated by a process in which an area containing a portion of pixels whose prediction signal has not been generated is defined as a template, the reproduced image stored in the storage means is defined as a reference area, an area in the reference area which has a high correlation with the template is selected as a duplicative reference area, and pixel values of corresponding pixels inside the duplicative reference area are given to pixels of which prediction signal has not been generated in the template, and wherein the prediction assist information includes information regarding an extending direction of the reproduced image.

2. The image decoding apparatus according to claim 1, wherein the first image prediction means generates by the first image prediction processing the prediction image in a predetermined scanning order with respect to the partial area which is specified as an area for which the prediction image has to be generated by the first image prediction processing on the basis of the coding mode information, and after the reproduced image based on the prediction image has been stored in the storage means, the second image prediction means generates by the second image prediction processing the prediction image in the predetermined scanning order with respect to the partial area which is specified as an area of which the prediction image has to be generated by the second image prediction processing on the basis of the coding mode information.

3. The image decoding apparatus according to claim 1, wherein the second image prediction means sets the prediction image generated by the second image prediction processing as the reproduced image.

4. The image decoding apparatus according to claim 1 wherein the image of the decoding target is a video frame; and
in the second image prediction processing, at least one of the reproduced image of the decoding target frame, which is the reproduced image stored in the storage means, and the reproduced image of a frame processed before the decoding target frame is set as the reference area.

5. The image decoding apparatus according to claim 1, wherein the first image prediction processing is a processing for generating the prediction image by using for the prediction the reproduced image in the same space as a processing target partial area; and
in the first image prediction processing, when an adjacent partial area, which is adjacent to the processing target partial area, is specified as the partial area for which the prediction image has to be generated by the second image prediction processing from the coding mode, the prediction image of the processing target partial area is generated based on a reproduced image of a non-adjacent partial area, which is not adjacent to the processing target partial area.

6. The image decoding apparatus according to claim 5, wherein in the first image prediction processing, when the adjacent partial area, which is adjacent to the processing target partial area, is specified as a partial area for which the prediction image has to be generated by the second image prediction processing from the coding mode, the prediction image is generated based on the pixel value of the pixel closest to the processing target partial area, among the reproduced image of the non-adjacent partial area located on a straight line of a prediction direction and located in the direction of a prediction origin.

7. The image decoding apparatus according to claim 1, wherein the bit stream includes data generated by encoding a signal that is based on a prediction residual image obtained by differential computation of the prediction image of the partial area and the image of this partial area;
the decoding means decodes the signal from the data which is contained in the bit stream and obtained by encoding the signal that is based on the prediction residual image; and
the image decoding apparatus further comprises reproduced image generation means for generating the reproduced image by adding the prediction image and the prediction residual image based on the signal decoded by the decoding means.

8. An image decoding method comprising: a decoding step in which decoding means decodes coding mode information and prediction assist information from a bit stream which includes data obtained by encoding the coding mode information for specifying between a first image prediction processing and second image prediction processing used for generating a prediction image with respect to each of a plurality of partial areas of predetermined size obtained by dividing an image of a decoding target and the prediction assist information for generating the prediction image by the first image prediction processing; a first image prediction step in which first image prediction means generates the prediction image of a partial area, out of the plurality of partial areas, that is specified as an area of which the prediction image has to be generated by the first image prediction processing on the basis of the coding mode information, by the first image prediction processing using the prediction assist information from an already-generated reproduced image; a second image prediction step in which second image prediction means generates, by using the second image prediction processing, the prediction image of a partial area, out of a plurality of partial areas, that is specified as an area of which the prediction image has to be generated by the second image prediction processing on the basis of the coding mode information; and a storage step in which storage means stores a reproduced image that is based on the prediction image, wherein, in the second image prediction processing, the prediction image is generated by a process in which an area containing a portion of pixels whose prediction signal has not been generated is defined as a template, the reproduced image stored in the storage means is defined as a reference area, an area in the reference area which has a high correlation with the template is selected as a duplicative reference area, and pixel values of corresponding pixels inside the duplicative reference area are given to pixels of which prediction signal has not been generated in the template, and wherein the prediction assist information includes information regarding an extending direction of the reproduced image.

9. A non-transitory computer readable medium including stored therein an image decoding program that when executed by a computer causes the computer to execute a method comprising: decoding coding mode information and prediction assist information from a bit stream which includes data obtained by encoding the coding mode information for specifying between a first image prediction processing and second image prediction processing used for generating a prediction image with respect to each of a plurality of partial areas of predetermined size obtained by dividing an image of a decoding target and the prediction assist information for generating the prediction image by the first image prediction processing; generating the prediction image of a partial area, out of the plurality of partial areas, that is specified as an area of which the prediction image has to be generated by the first image prediction processing on the basis of the coding mode information, by the first image prediction processing using the prediction assist information; generating by the second image prediction processing the prediction image of a partial area, out of the plurality of partial areas, that is specified as an area for which the prediction image has to be generated by the second image prediction processing on the basis of the coding mode information; and storing a reproduced image that is based on the prediction image in a storage means, the prediction image being generated by a process in which an area containing a portion of pixels whose prediction signal has not been generated is defined as a template, the reproduced image stored in the storage means is defined as a reference area, an area in the reference area which has a high correlation with the template is selected as a duplicative reference area, and pixel values of corresponding pixels inside the duplicative reference area are given to pixels of which prediction signal has not been generated in the template, and the prediction assist information includes information regarding an extending direction of the reproduced image.

* * * * *